US008055575B2

(12) United States Patent
Grody et al.

(10) Patent No.: US 8,055,575 B2
(45) Date of Patent: Nov. 8, 2011

(54) CENTRAL COUNTERPARTY FOR DATA MANAGEMENT

(75) Inventors: Allan D. Grody, New York, NY (US); Richard R. Tinervin, Hilton Head Island, SC (US)

(73) Assignee: Financial Intergroup Holdings, Ltd., New York, NY (US)

( * ) Notice: Subject to any disclaimer, the term of this patent is extended or adjusted under 35 U.S.C. 154(b) by 0 days.

(21) Appl. No.: 12/927,597

(22) Filed: Nov. 18, 2010

(65) Prior Publication Data

US 2011/0071958 A1    Mar. 24, 2011

Related U.S. Application Data

(63) Continuation-in-part of application No. 11/544,570, filed on Oct. 10, 2006, now abandoned.

(60) Provisional application No. 60/726,984, filed on Oct. 14, 2005.

(51) Int. Cl.
*G06Q 40/00* (2006.01)
(52) U.S. Cl. .................................................... 705/37
(58) Field of Classification Search ............. 705/35, 705/36 T, 36 R, 37
See application file for complete search history.

(56) References Cited

U.S. PATENT DOCUMENTS

| | | | |
|---|---|---|---|
| 4,109,238 A | 8/1978 | Creekmore | |
| 4,903,201 A | 2/1990 | Wagner | |
| 4,989,144 A | 1/1991 | Barnett, III | |
| 5,285,383 A | 2/1994 | Lindsey | |
| 5,497,317 A * | 3/1996 | Hawkins et al. ............... | 705/37 |
| 5,677,955 A | 10/1997 | Doggett | |
| 5,691,524 A | 11/1997 | Josephson | |
| 5,802,499 A | 9/1998 | Sampson | |
| 5,848,400 A | 12/1998 | Chang | |
| 5,893,079 A * | 4/1999 | Cwenar ...................... | 705/36 R |
| 5,983,203 A | 11/1999 | Church | |
| 6,029,146 A * | 2/2000 | Hawkins et al. ............... | 705/35 |
| 6,347,307 B1 | 2/2002 | Sandhu | |
| 6,754,640 B2 | 6/2004 | Bozeman | |
| 6,772,216 B1 | 8/2004 | Ankireddipally | |
| 6,817,008 B2 | 11/2004 | Ledford | |
| 7,110,969 B1 | 9/2006 | Bennett | |
| 7,212,997 B1 * | 5/2007 | Pine et al ................... | 705/36 R |
| 7,398,262 B1 | 7/2008 | Curtis | |
| 7,610,239 B1 * | 10/2009 | Silverman et al. ............. | 705/37 |

(Continued)

OTHER PUBLICATIONS

Joe Kelly (jktrader), "The Bloomberg Terminal: Elite Technology for Traders", investingwithjoe.wordpress.com/2011/03/02/the-bloomberg-terminal-elite-technology-for-traders/, Mar. 2, 2011, 5 pages.

(Continued)

*Primary Examiner* — Charles Kyle
*Assistant Examiner* — Greg Pollock
(74) *Attorney, Agent, or Firm* — Brenda Pomerance

(57) ABSTRACT

A central counterparty for data management (CCDM) receives data relating to financial transactions, associates the data with metadata to create reference data, stores the reference data and provides the reference data in "push" and "pull" ways. The "push" techniques for providing the data include distributing on a data feed, sending the data to parties known to be relevant to the transaction, and sending the data to parties who have a standing query that is satisfied by the data. The "pull" techniques for providing the data include responding to queries received from a variety of parties. The CCDM generates and distributes unique, unambiguous and universal identifiers (U3id's) and associates the U3id identifiers with the reference data.

20 Claims, 26 Drawing Sheets

U.S. PATENT DOCUMENTS

| | | | |
|---|---|---|---|
| 7,925,566 B1* | 4/2011 | Naratil | 705/37 |
| 2001/0049649 A1 | 12/2001 | Baecker | |
| 2002/0150093 A1 | 10/2002 | Ott | |
| 2003/0033240 A1* | 2/2003 | Balson et al. | 705/37 |
| 2004/0030624 A1 | 2/2004 | Nishimaki | |
| 2005/0097026 A1* | 5/2005 | Morano et al. | 705/37 |
| 2005/0149428 A1 | 7/2005 | Gooch | |
| 2005/0216416 A1 | 9/2005 | Abrams | |
| 2006/0136318 A1* | 6/2006 | Rafieyan et al. | 705/37 |
| 2007/0219991 A1* | 9/2007 | Guthrie | 707/6 |
| 2008/0097893 A1* | 4/2008 | Walsky et al. | 705/37 |
| 2008/0154764 A1* | 6/2008 | Levine et al. | 705/37 |

OTHER PUBLICATIONS

Peter Farrow et al, "Instant Gratification: Bloomberg Tradebook API", www.bloombergtradebook.com/pdfs/tradebook_portal_api_review.pdf, Jul. 2010, 9 pages.

IB Group, "Superior Trading Technology", www.interactivebrokers.com/en/general/whyib/PDF-SuperiorTradingTechnology.php, Aug. 2011, 3 pages.

IB Group, "Trading Platforms", www.interactivebrokers.com/en/pagemap/pagemap_trading_platforms.php, Aug. 2011, 3 pages.

IB Group, "API Solutions", www.interactivebrokers.com/en/pagemap/pagemap_APISolutions.php?ib_entity=llc, Aug. 2011, 2 pages.

Securities Industry Association, The Data Management Division of Wall Street Industry-wide Glossary Committee Findings, Aug. 19, 1993, New York, NY, pp. 1-26, A-1 to A-5.

Depository Trust Company; Industry Standards Glossary—Concepts and Findings; Jul. 8, 1994; New York, NY, pp. 1-80, A-1 to A-4, B-1 to B-8, C-1 to C-2, G-1 to G4, I-1 to I-3.

John Goeller and Katherine Roche; Securities Industry Association (SIA) and PWC Consulting; T+1 Standards/Codes of Practice, Standards Sub-committee Report, Institutional Equity and Fixed Income T+1 Post-Execution through Settlement, version 2, Jan. 2002; New York, NY, pp. 1-24 and A-1 to A-7.

The Depository Trust & Clearing Corporation; Straight-Through Processing: A New Model for Settlement, Jan. 2002; New York, NY, 24 pages +cover.

Canadian Capital Markets Association (CCMA); STP/T+1 Value Proposition Survey; Oct. 15, 2002; Toronto, Ontario, Canada, 27 pages.

A-Team Consulting Ltd, sponsored by Cicada; "Securities Administration Data—The Essential Piece of the STP Puzzle"; 2002; London, UK , 162 pages.

Securities and Exchange Commission, Securities Transactions Settlement; Proposed Rule; Federal Register / vol. 69, No. 53 / Thursday, Mar. 18, 2004, p. 12922-12936.

Securities Industry Association; "STP Business Practices and Matching Implementation—Institutional Matching User Requirements" Final Vers., Aug. 2003; NY, NY, 52 pages.

Oxera Consulting Ltd, sponsored by The Depository Trust & Clearing Corporation; "Corporate action processing: what are the risks?"; May 2004; NY, NY, 45 pages.

Ivy Schmerken, Wall Street & Technology Magazine, "Learning How to Share"; Nov. 29, 2004; New York, NY, 6 pages.

AIM Software in cooperation with Prof. Arnold from the Department for Applied Regional and Economic Geography, Vienna University of Economics and Business Administration; AIM Global Data Mgmt. Survey, 2004; Vienna, Austria, 102 pages.

A-Team Group, commissioned by SunGard; "Outsourcing Survey: Reference Data Management—Who should handle it?", May 2005, London, UK, 43 pages.

Allan D. Grody, "Shortening the Settlement Cycle in U.S. Securities Markets: Focus on T+1", Nomura Research Institue, Nov. 28, 2001, pp. 1-5.

David Rowe, "A crisis of identity", www.risk.net, Jul. 2002, 1 page.

Security Industry Association, The Data Management Division of Wall Street Industry-wide Glossary Committee Findings, Aug. 19, 1993, New York, NY.

Depository Trust Company; Industry Standards Glossary—Concepts and Findings; Jul. 8, 1994; New York, NY.

John Goeller and Katherine Roche; Securities Industry Association (SIA) and PWC Consulting; T+1 Standards/Codes of Practice, Standards Sub-committee Report, Institutional Equity and Fixed Income T+1 Post-Execution through Settlement, version 2, Jan. 2002; New York, NY.

The Depository Trust & Clearing Corporation; Straight-Through Processing: A New Model for Seattlement, Jan. 2002; New York, NY.

Canadian Capital Markets Association (CCMA); STP/T+1 Value Proposition Survey; Oct. 15, 2002; Toronto, Ontario, Canada.

A-Team Consulting Ltd, sponsored by Cicada; Securities Administration Data—The Essential Piece of the STP Puzzle; 2002; London, UK.

Securities and Exchange Commission, Securities Transactions Settlement; Proposed Rule; Federal Register / vol. 69, No. 53 / Thursday, Mar. 18, 2004, p. 12922.

Securities Industry Association; STP Business Requirements and Matching Implementation—Institutional Matching User Requirements Final Version, Aug. 2003; New York, NY.

Oxera Consulting Ltd, sponsored by the Depository Trust & Clearing Corporation; Corporate action processing: what are the risks?; May 2004; New York, NY.

Ivy Schmerken, Wall Street & Technology Magazine, Learning How to Share; Nov. 29, 2004; New York, NY.

AIM Software in cooperation with Prof. Arnold from the Department for Applied Regional and Economic Geography, Vienna University of Economics and Business Administration; AIM Global Data Management Survey, 2004; Vienna, Austria.

A-Team Research commissioned by SunGard; Outsourcing Survey: Reference Data Management—Who should handle it?; May 2005; London, UK.

* cited by examiner

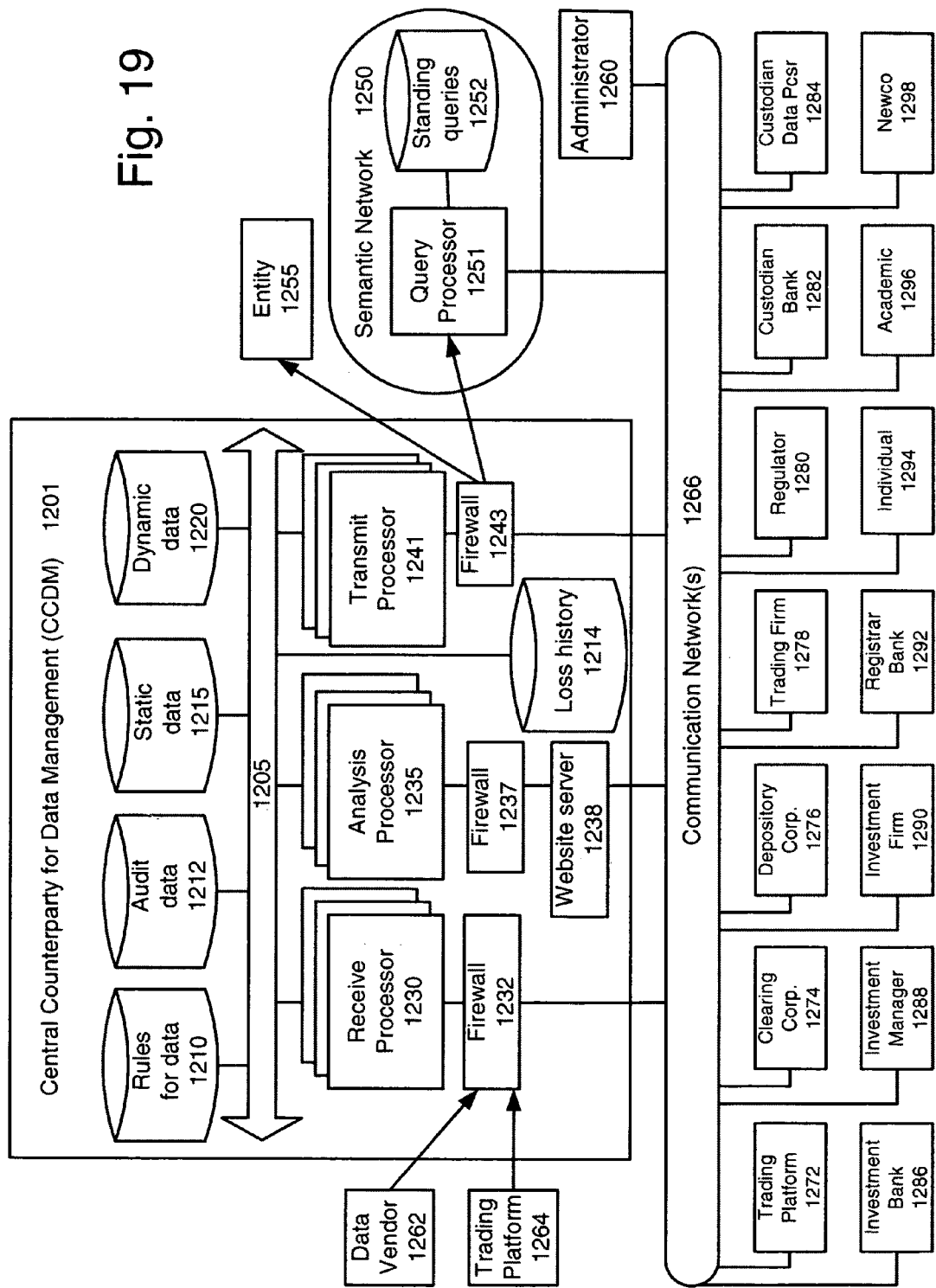

Request for Error Reimbursement

U3id of transaction: [1SGZ B456 WWXN 6234 PRQV 9292 JVLF]

This is a: [KYZ trade, 100 shares, buyer: YOU, seller: GS, share price $21.83, 11/11/2011 at 11:11:11 am, NYSE ARCA]

Is this correct? ● Yes  ○ No

Error Type (select one): [wrong counterparty / wrong quantity / wrong price / wrong security]

How did you notice this error? [               ]

Your best guess at the error source. [               ]

Reimbursement amount requested: $ [      .00]

How did you determine the reimbursement amount? [               ]

(Cancel)  (Send)

Fig. 24

CENTRAL COUNTERPARTY FOR DATA MANAGEMENT

CROSS-REFERENCE TO RELATED APPLICATIONS

This application is a continuation-in-part of U.S. patent application Ser. No. 11/544,570, filed Oct. 10, 2006, having common inventors herewith, which in turn claims priority from U.S. provisional patent application Ser. No. 60/726,984, filed Oct. 14, 2005. Each of the Ser. No. 11/544,570 and 60/726,984 applications is hereby incorporated by reference in its entirety.

BACKGROUND OF THE INVENTION

The present invention relates data processing for the financial industry, and more particularly, is directed to a centralized repository of static information involved in securities trading, with various information distribution capabilities.

Securities trading, particularly the post-trade activities of clearance and settlement, still gives rise to many errors, even almost fifty years of increasingly advanced automation.

Another problem is that different departments in a securities firm usually have their own data handling practices, and their own databases, sometimes referred to as data silos. Accordingly, it can be difficult or impossible for a firm to accurately aggregate its own data.

A further problem is that securities firms each maintain their data at their discretion in differing formats and with identifiers of their own choosing, so it can be difficult or impossible for a regulatory agency to accurately aggregate data from different firms.

A 2008 survey by TowerGroup asked firms with automated trade processing capability what were the reasons for trades being rejected from automated processing, and obtained the following results:

91.1% of automated trades are not rejected
    1.8% of automated trades are rejected due to disparities between databases
    3.0% of automated trades are rejected due to bad reference data
    4.1% of automated trades are rejected for other reasons In the US alone, in just one payment and settlement facility, Depository Trust and Clearing Corporation (DTCC), nearly $7.5 trillion of traded value is associated with trade matching on any one day. There are nearly 100 such facilities globally. Although DTCC is by far the largest these error rates are significant to the values at risk at such facilities globally.

Thus, there is a need for improved techniques for processing financial information in the securities industry.

SUMMARY OF THE INVENTION

In accordance with an aspect of this invention, there is provided a method of distributing financial reference data, comprising receiving, by a computer, external data from a data source, associating, by the computer, the external data with metadata to generate reference data, storing, by the computer, the reference data, transmitting, by the computer, the reference data on a data feed to a data consumer, comparing, by the computer, the reference data with a standing query, and when the reference data satisfies the standing query, sending, by the computer, the reference data to an owner of the standing query.

In accordance with another aspect of this invention, there is provided a method of using financial reference data, comprising receiving, by a first computer, the financial reference data from a second computer, and appending, by the first computer, the financial reference data to a trading order, wherein the financial reference data results from receiving, at the second computer, external data from a data source, and associating, at the second computer, the external data with metadata to generate the reference data.

In accordance with a further aspect of this invention, there is provided an apparatus for distributing financial reference data, comprising a first communication interface for receiving external data from a data source, a processor for associating the external data with metadata to generate reference data, a data storage for storing the reference data, a second communication interface for transmitting the reference data on a data feed to a data consumer, wherein the processor is also for comparing the reference data with a standing query, and when the reference data satisfies the standing query, sending the reference data to an owner of the standing query.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 19 is a block diagram showing a hardware and communication configuration for a second embodiment of a CCDM;

FIG. 24 is diagram of a screen display for claiming error reimbursement; and

DETAILED DESCRIPTION

The present invention is a central counterparty for data management (CCDM) that receives data relating to financial transactions, associates the data with metadata to generate reference data, and provides the reference data in "push" and "pull" ways. The "push" techniques for providing the data include distributing on a data feed, sending the data to parties known to be relevant to the transaction, and sending the data to parties who have a standing query that is satisfied by the data. The "pull" techniques for providing the data include responding to queries received from a variety of parties.

The metadata may be received from the source of the data or added by the CCDM. The metadata may be stored explicitly, such as by an identification field, or implicitly, such as in a particular pre-defined field of a database.

Another important function of the CCDM is to generate unique, unambiguous and universal identifiers, each referred to as a "U3id", to associate the U3id identifiers with reference data, and to distribute the U3id identifiers to public, commercial and government entities.

Before describing the CCDM, some instances of prior art data errors will now be discussed.

Figure 1:
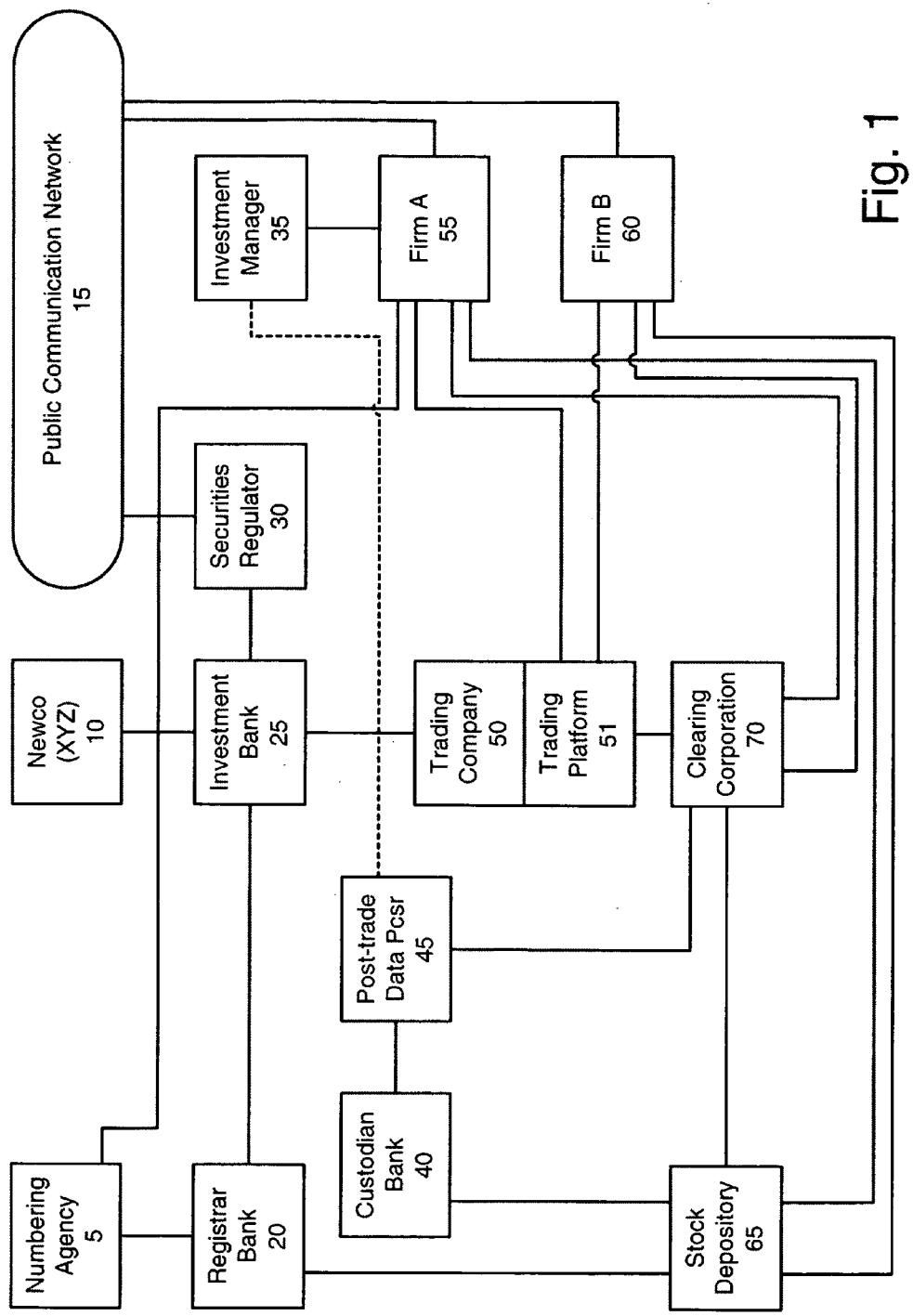
FIG. 1 is a block diagram showing a prior art hardware and communication configuration.

FIG. 1 is a block diagram showing a prior art hardware and communication configuration. The elements of FIG. 1 are each general purpose computers having sufficient memory, storage and communications capability to function as described, and may have a human interface such as a client terminal that may include a processor. The communications capability may be a direct communication line, or a virtual private network using a public data network, or data packets sent securely over a public data network. The communication lines may be wire line or wireless, or a combination thereof, such as a wireless connection at one end coupled to a wire line transmission facility that terminates in a wire line or wireless local connection.

FIG. 1 includes numbering agency 5, Newco 10, public data communication network 15, registrar bank 20, investment bank 25, securities regulator 30, investment manager 35, custodian bank 40, financial industry post-trade data processor 45, trading company 50, trading platform 51, trading firm 55 (also referred to as Firm A), trading firm 60 (also referred to as Firm B), stock depository 65 and clearing corporation 70.

Numbering agency 5 provides an identifying number for a security. Standard & Poor's is an instance of numbering agency 5. A CUSIP is an instance of an identifying number.

The acronym CUSIP historically refers to the Committee on Uniform Security Identification Procedures and is a 9-character alphanumeric code that identifies any North American security for the purposes of facilitating clearing and settlement of trades. The CUSIP distribution system is owned by the American Bankers Association, under its status as a National Numbering Agency, such status given by the International Standards Organization (ISO), and is operated by Standard & Poor's. The CUSIP Service Bureau acts as the National Numbering Association (NNA) for North America, and the CUSIP serves as the National Securities Identification Number for products issued from both the United States and Canada. The first six characters are known as the base (or CUSIP-6), and uniquely identify the issuer. Issuer codes are assigned alphabetically from a series that includes deliberate built-in "gaps" for future expansion. The 7th and 8th digit identify the exact issue. The 9th digit is an automatically generated checksum (some clearing bodies ignore or truncate the last digit). To calculate the check digit every second digit is multiplied by two. Letters are converted to numbers based on their ordinal position in the alphabet. The last three characters of the issuer code can be letters, in order to provide more room for expansion.

Newco 10 is an instance of a company that issues securities for public trading.

Public data communication network 15 is a packet switched communication network incorporating routers, trunk lines, access lines and so on. The Internet is an instance of network 15.

Registrar bank 20 provides share registry services for issuers of publicly traded securities such as Newco 10. Generally, share registry services include keeping track of how many shares the company has issued, who owns the shares, ensuring that the total shares at stock depository 65 equal the total shares issued by Newco 10, and serving as the transfer agent for owners of Newco shares—keeping books and records on their behalf.

Investment bank 25 represents a company that issues securities, and takes care of the administrative details of issuing the securities and also sells (places) the securities on behalf of the company. Typically, investment bank 25 creates a draft Offering Memorandum in compliance with securities offering laws, called a "red herring", and distributes the red herring to prospective share purchasers, possibly via other investment banks, and often in conjunction with an in-person presentation of the company to prospective purchasers, called a "road show". Based on response to the red herring, investment bank 25 determines the price for the securities, and then files the actual Offering Memorandum with the initial price to enable the start of public trading.

Securities regulator 30 is a government entity tasked with monitoring and regulating the financial industry.

Investment manager 35 is an individual or firm that manages an investment fund on behalf of the fund owner such as an individual or a group of individuals, a mutual fund, a pension fund, deciding when to buy and sell securities, and often deciding which securities to buy and sell, which trading platform to use, and which trading firm to use.

Custodian bank 40 provides services such as to:
hold in safekeeping assets/securities such as stocks, bonds, commodities such as precious metals and currency (cash), domestic and foreign
arrange settlement of any purchases and sales and deliveries in/out of such securities and currency
collect information on and income from such assets (dividends in the case of stocks/equities and coupons (interest payments) in the case of bonds) and administer related tax withholding documents and foreign tax reclamation
administer voluntary and involuntary corporate actions on securities held such as stock dividends, splits, business combinations (mergers), tender offers, bond calls, etc.
provide information on the securities and their issuers such as annual general meetings and related proxies
maintain currency/cash bank accounts, effect deposits and withdrawals and manage other cash transactions
perform foreign exchange transactions often perform additional services for particular clients such as mutual funds; examples include fund accounting, administration, legal, compliance and tax support services provide regular and special reporting on any or all their activities to their clients or authorized third parties such as MAIC Trust Account services for mergers & acquisitions payments.

Financial industry post-trade data processor 45 provides, to investment manager 35, custodian bank 40, trading firms 55 and 60, and stock depository 65, automated trade life cycle events, including notice of execution, allocation, confirmation/affirmation, settlement notification, enrichment of trades with standing settlement instructions, operational analytics and counterparty risk management between trade counterparties. Omgeo is an instance of financial industry post-trade data processor 45.

Trading company 50 is a marketplace for securities trading, such as NYSE Euronext. The actual trading occurs on trading platform 51 operated by trading company 50. NYSE Equities, NYSE Arca Equities, Euronext Equities and ArcaEdge are instances of trading platform 51.

Trading firms 55 and 60 are members of trading company 50, and provide order entry, execution, and post-trade services to their customers, and may also have proprietary accounts that they trade on their own behalf.

Stock depository 65 provides clearing and settlement efficiencies by immobilizing securities and making "book-entry" changes to ownership of the securities. Stock depository 65 serves as the transfer agent for the financial industry, keeping books on behalf of trading firms. Depository Trust Corporation (DTC) is an instance of stock depository 65.

Clearing corporation 70 provides clearing, settlement, risk management, central counterparty services and a guarantee of completion for certain transactions for virtually all broker-to-broker trades involving equities, nets trades and payments among its participants, reducing the value of securities and payments that need to be exchanged each day. Clearing corporation 70 generally clears and settles trades on a T+3 basis. National Securities Clearing Corporation (NSCC) is an instance of clearing corporation 70. DTC provides securities movements for NSCC's net settlements. DTC and NSCC are owned by DTCC.

On trade date (T), the clearance and settlement cycle begins. Trade details are electronically transmitted to clearing corporation 70 for processing. For equity transactions, while 99.9% are sent as "locked-in" trades, which means that the marketplace has already compared them at the time of execution, confirming all details, includes share security, quantity and price, the potential for errors introduced after this "lock-in" is still significant. Additional processes described as clearance and settlement must follow to actually distribute securities to new owners from previous ones, and make payment between these same parties and/or their agents. Clearing corporation 70 sends to participants automated reports showing trade details for transactions that have entered clearance and settlement processing.

Clearing corporation 70 guarantees settlement for cleared trades. The guarantee generally begins at midnight between T+1 and T+2. At this point, clearing corporation 70 steps into the middle of a trade via a legal process called novation, and assumes the role of central counterparty, taking on the buyer's credit risk and the seller's delivery risk. This guarantee eliminates uncertainty for market participants and inspires public confidence.

Two days after trade date (T+2), clearing corporation 70 issues summaries of all compared trades, including information on the net positions of each security due or owed for settlement.

Three days after trade date (T+3) is settlement day, when securities are delivered to buyers and money is paid to sellers. Trading firms instruct their settling banks to send or receive funds through the Federal Reserve System to/from depository corporation 65 as the agent for clearing corporation 70. Securities generally do not change hands physically.

Figure 2:
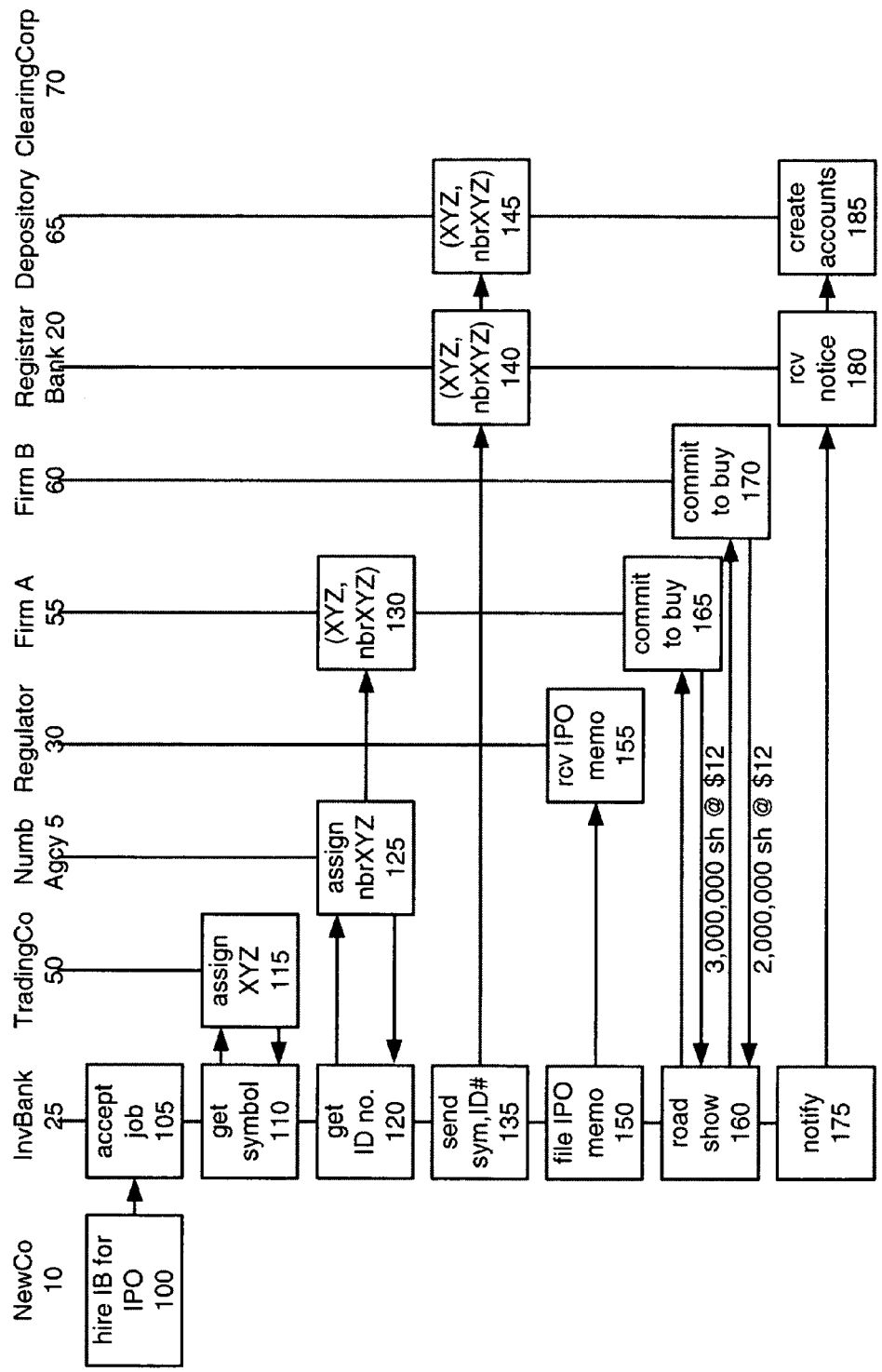
FIG. 2 is a flowchart showing prior art pre-trading activity.

FIG. 2 is a flowchart showing prior art pre-trading activity.

At step 100, Newco 10 hires investment bank 25 to serve as its representative for an initial public offering of shares in Newco 10.

At step 105, investment bank 25 accepts the task from Newco 10.

At step 110, investment bank 26 requests a symbol for Newco 10 from trading company 50, to be used to designate shares of Newco 10 on trading platform 51.

At step 115, trading company 50 assigns the symbol "XYZ" to Newco 10.

At step 120, investment bank 25 requests a symbol identifier from numbering agency 5.

At step 125, numbering agency 5 assigns "nbrXYZ" as the symbol identifier, and sends this to all parties that are subscribers to the "new identifier" update service of numbering agency 5.

At step 130, firm 55, a subscriber to the "new identifier" update service of numbering agency 5, receives the information associating Newco 10, XYZ and nbrXYZ.

At step 135, investment bank 25 sends the newly obtained symbol and symbol identifier to registrar bank 20.

At step 140, registrar bank 20 receives the newly obtained symbol and symbol identifier, and forwards this information to depository 65.

At step 145, depository 65 receives the newly obtained symbol and symbol identifier.

At step 150, investment bank 25 files its draft Offering Memorandum (red herring) with regulator 30.

At step 160, investment bank 25 presents the new security to potential buyers at various meetings (road show), assesses interest, and advises that the initial offering price will be $12 per share. Firm 55 gets the identifier via an automated feed from numbering agency 5. Firm 60 sees the identifier in the red herring, and manually enters the identifier into its system.

At step 165, firm 55 commits to buy 3,000,000 shares at the initial price. Typically, firm 55 combines orders for its own proprietary trading account with customer orders to arrive at its total commitment.

At step 170, firm 60 commits to buy 2,000,000 shares at the initial price.

At step 175, investment bank 25 notifies registrar bank 20 that, when trading commences, firm 55 will own 3,000,000 shares and firm 60 will own 2,000,000 shares.

At step 180, registrar bank 20 receives and records the information, then passes it on to depository 65.

At step 185, depository 65 receives the notice of the initial owners of the shares.

On the actual initial public offering date (not shown), as soon as trading starts, firms 55 and 60 are recognized as the share owners. Assuming there are no other buyers, no sale activity occurs, and the total share offering was 10,000,000 shares, at the end of the day, each of registrar bank 20 and depository 65 have recorded share ownership as follows:

| | |
|---|---|
| XYZ, nbrXYZ, NewCo 10 | |
| total 10,000,000 shares | |
| NewCo. 10 | 5,000,000 shares |
| Firm 55 | 3,000,000 shares |
| Firm 60 | 2,000,000 shares |

Figure 3:
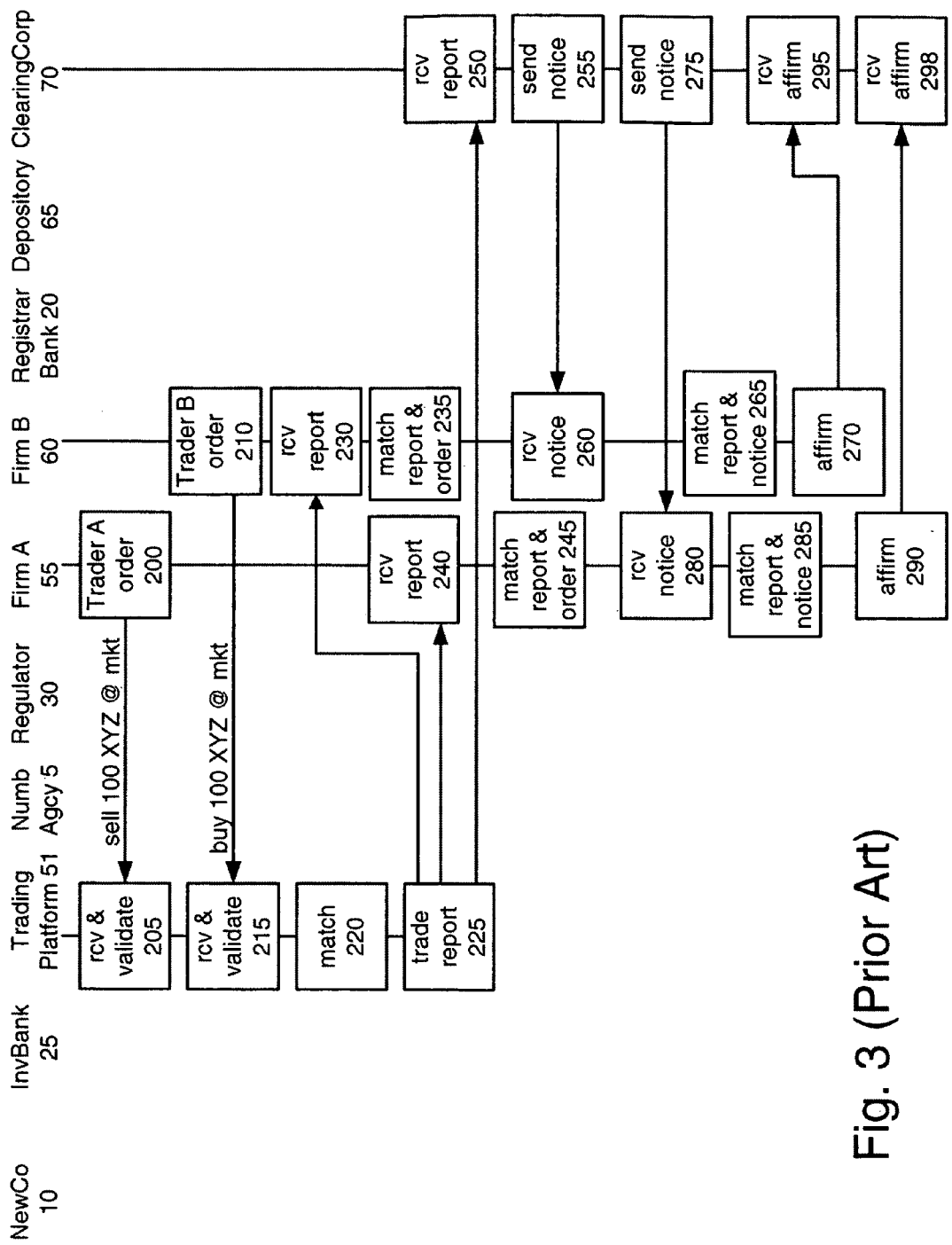
FIG. 3 is a flowchart showing prior art trade day activity with proprietary trading.

FIG. 3 is a flowchart showing prior art trade day activity with proprietary trading.

Let it be assumed that, some time after the initial public offering, firm 55 decides to sell 100 shares of XYZ at the market price for its own account, and firm 60 decides to buy 100 shares of XYZ for its own account.

At step 200, trader A at firm 55 creates a sell order for 100 shares of XYZ at the market price, and sends it to trading platform 51.

At step 205, trading platform 51 receives the sell order, validates its terms, and stores the sell order in its trading book, that is, its database of orders waited to be executed.

At step 210, trader B at firm 60 creates a buy order for 100 shares of XYZ at the market price, and sends it to trading platform 51.

At step 215, trading platform 51 receives the buy order, validates its terms, and searches for any possible matches prior to storing the order in its trading book.

At step 220, trading platform 51 finds the sell order from trader A and matches it with the buy order from trader B, thereby creating an executed trade.

At step 225, trading platform 51 sends trade reports, also known as execution reports, to the parties involved in the trade and to clearing corporation 70. The trade report to trader A is as follows:

SOLD 100 shares XYZ at $21.12 to Firm 60

The trade report to trader B is as follows:

BOT 100 shares XYZ at $21.12 from Firm 55

The trade report to clearing corporation 70 is as follows:

nbrXYZ 100 shares at $21.12 Firm 60 to Firm 55

Additionally (not shown), trading platform 51 reports the trade as a market data update to its market data distribution system (not shown), which disseminates the trade information to the public.

At step 230, firm 60 receives its execution report.

At step 235, firm 60 matches the execution report with the order to buy 100 shares from trader B.

At step 240, firm 55 receives its execution report.

At step 245, firm 55 matches the execution report with the order to sell 100 shares from trader A.

At step 250, clearing corporation 70 receives the trade report.

At step 255, clearing corporation 70 sends a settlement notice to firm 60.

At step 260, firm 60 receives the settlement notice from clearing corporation 70.

At step 265, firm 60 matches the settlement notice with the execution report that it bought 100 shares of XYZ.

At step 270, firm 60 sends an affirm notice to clearing corporation 70, accepting the settled trade.

At step 275, clearing corporation 70 sends a settlement notice to firm 55.

At step 280, firm 55 receives the settlement notice from clearing corporation 70.

At step 285, firm 55 matches the settlement notice with the execution report that it sold 100 shares of XYZ.

At step 290, firm 55 sends an affirm notice to clearing corporation 70, accepting the settled trade.

At step 295, clearing corporation 70 receives the affirm from firm 60.

At step 298, clearing corporation 70 receives the affirm from firm 55. The trade is now fully confirmed. Clearing corporation 70 novates itself into the trade, creating a first legal obligation to buy 100 shares of XYZ from firm 55, and a second legal obligation to sell 100 shares of XYZ to firm 60, and guarantees to each of firms 55 and 60 that its respective obligation will settle on T+3. Then, clearing corporation 70 aggregates all activity for XYZ for firm 55 to create a net position for that day's activity, and aggregates all activity for firm 60 to create a net position for that day's activity. For this example, we assume that the only trade that occurred during the day was the sale of 100 shares of XYZ. Clearance is now complete.

Figure 4:
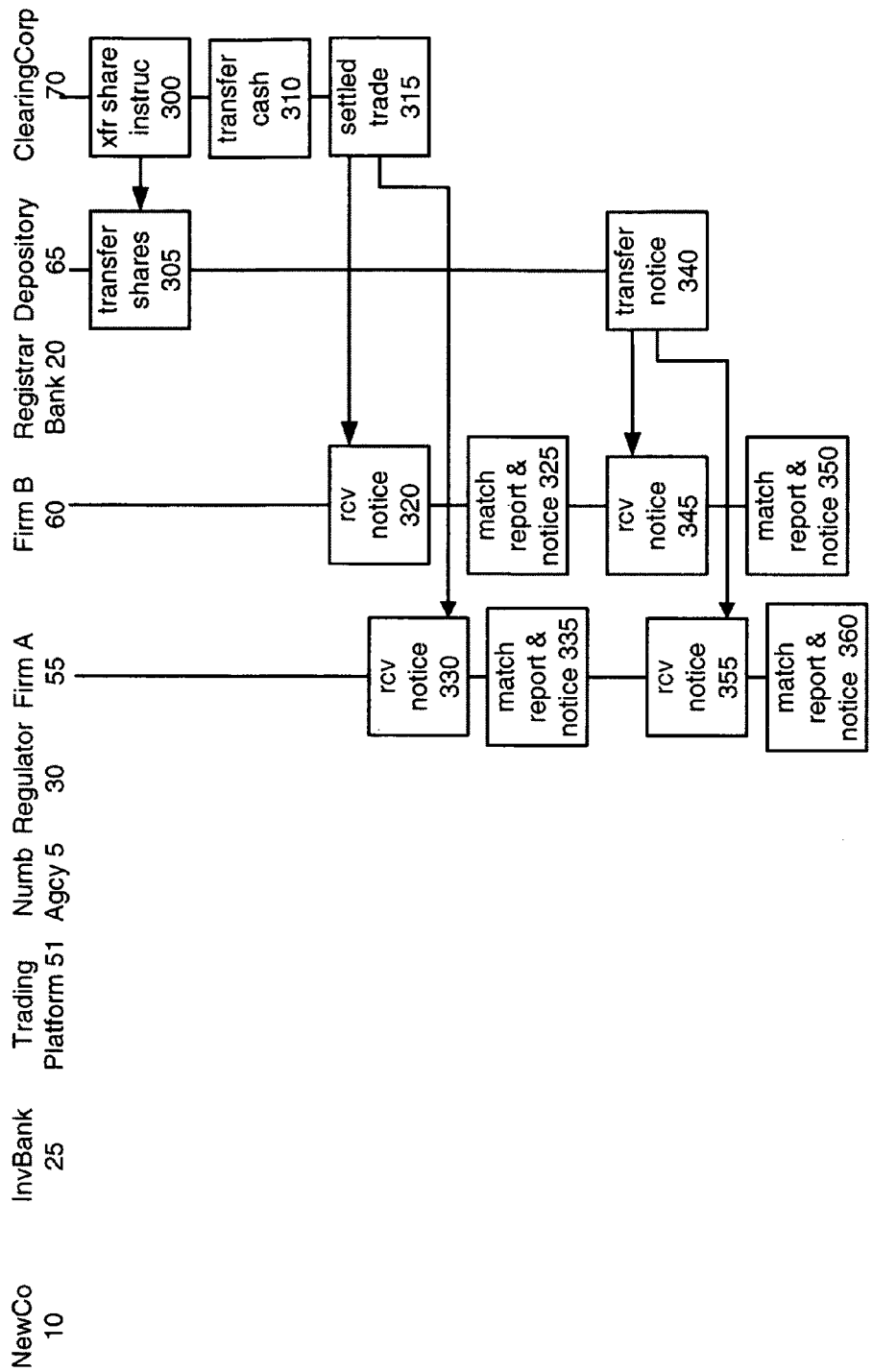
FIG. 4 is a flowchart showing prior art settlement day activity.

FIG. 4 is a flowchart showing prior art settlement day activity.

At step 300, clearing corporation 70 sends share transfer instructions to depository 65, to transfer 100 shares of XYZ from the account of firm 55 to firm 60.

At step 305, depository 65 transfers the shares. Depository 65 has recorded share ownership as follows, assuming that only this one trade of 100 shares of XYZ occurred since the security was issued.

| | |
|---|---|
| XYZ, nbrXYZ, NewCo 10 | |
| total 10,000,000 shares | |
| NewCo. 10 | 5,000,000 shares |
| Firm 55 | 2,999,900 shares |
| Firm 60 | 2,000,100 shares |

At step 310, clearing corporation 70 transfers cash in its internal cash accounts from the account for firm 60 to the account for firm 55. In some embodiments, instead of using internal cash accounts, clearing corporation 70 sends instructions to the banks associated with firms 55 and 60, or, if firms 55 and 60 can interact directly with the federal funds transfer system, then to them.

At step 315, clearing corporation 70 sends a notice that the trade has settled to each of firms 55 and 60.

At step 320, firm 60 receives the notice of settled trade.

At step 325, firm 60 matches the settlement notice to its execution report.

At step 330, firm 55 receives notice of the settled trade.

At step 335, firm 55 matches the settlement notice to its execution report.

At step 340, depository 65 sends a share transfer notice to each of firms 55 and 60.

At step 345, firm 60 receives the share transfer notice.

At step 350, firm 60 matches the share transfer notice with the execution report, and concludes that the trade is fully and properly settled.

At step 355, firm 55 receives the share transfer notice.

At step 360, firm 55 matches the share transfer notice with the execution report, and concludes that the trade is fully and properly settled.

Two instances of errors that occur in the prior art will now be discussed.

It will be seen that due to the frequent matching of information regarding the progress of the trade, the errors are discovered, and are likely to be corrected. However, there is still a large cost for the manual processing required for errors. Furthermore, if the manual processing does not finish by T+3, the firm will have to borrow cash or stock to ensure settlement, which is costly and then may have to be reversed when error processing concludes.

It will be appreciated that other trading data errors also occur with similar consequences: the cost for manual error processing, and additional costs if the manual error processing does not complete by T+3.

Figure 5:
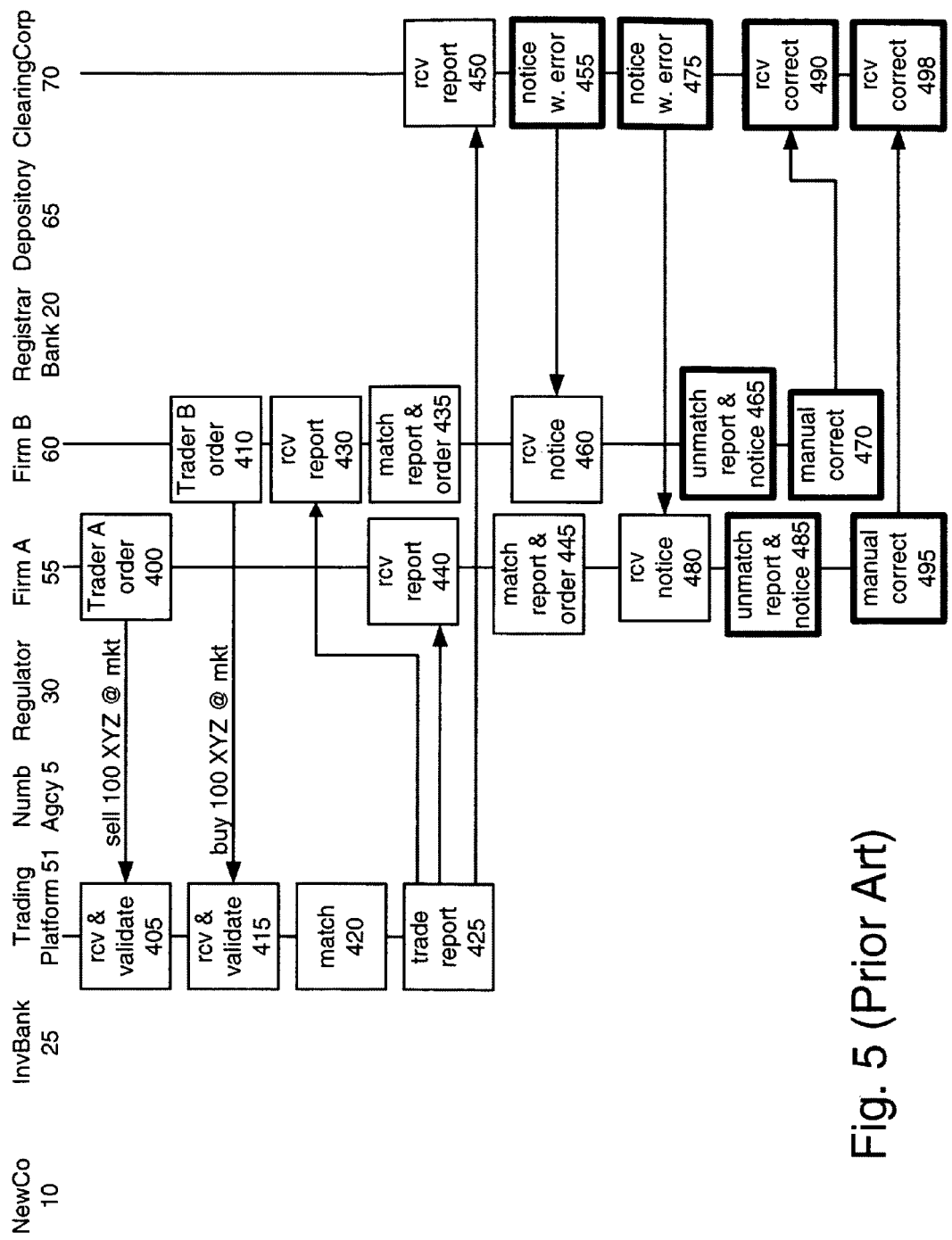
FIG. 5 is a flowchart showing a prior art clearing error.

FIG. 5 is a flowchart showing a prior art clearing error.

FIG. 5 is similar to FIG. 3, and for brevity, only differences will be discussed. In this case, the error is that clearing corporation 70 has stored the wrong company name for the identifier. That is, instead of correctly associating (nbrXYZ, Newco 10), clearing corporation 70 has mistakenly stored (nbrXYZ, Gemco) and has correctly stored that the symbol for Gemco is JMO.

Steps 400-450 of FIG. 5 correspond to steps 200-250 of FIG. 3.

At step 455, clearing corporation 70 sends a settlement notice to firm 60, showing that firm 60 bought 100 shares of Gemco symbol JMO.

At step 460, firm 60 receives the settlement notice from clearing corporation 70.

At step 465, firm 60 tries to match the settlement notice that it bought 100 shares of JMO with the execution report that it bought 100 shares of XYZ, but since they do not match, the settlement notice remains unmatched and is flagged in an automatically produced error report. A clerk at firm 60, or an automated error handling system at firm 60, suspects that the settlement notice should match the execution report, perhaps because the identifier nbrXYZ is on both the notice and report, or perhaps because the same share quantity is on both the notice and report, or perhaps because the same execution time is on both the notice and report. Generally, a clerk at firm 60 will call a clerk at clearing corporation 70 and hopefully notice that clearing corporation 70 has the wrong company name for the identifier nbrXYZ.

At step 470, firm 60 sends a correction notice to clearing corporation 70.

At step 475, clearing corporation 70 sends a settlement notice to firm 55, showing that firm 55 sold 100 shares of Gemco symbol JMO.

At step 480, firm 55 receives the settlement notice from clearing corporation 70.

At step 485, firm 55 is unable to match the settlement notice that it sold 100 shares of JMO with the execution report that it sold 100 shares of XYZ. Similar processing occurs in firm 55 as occurred in firm 60 at step 465.

At step 495, firm 55 sends a correction notice to clearing corporation 70.

At step 490, clearing corporation 70 receives the correction notice from firm 60.

At step 498, clearing corporation 70 receives the correction notice from firm 55. A clerk at clearing corporation 70 decides that the trade has been cleared, and ensures that the error in the database is corrected.

Figure 6:
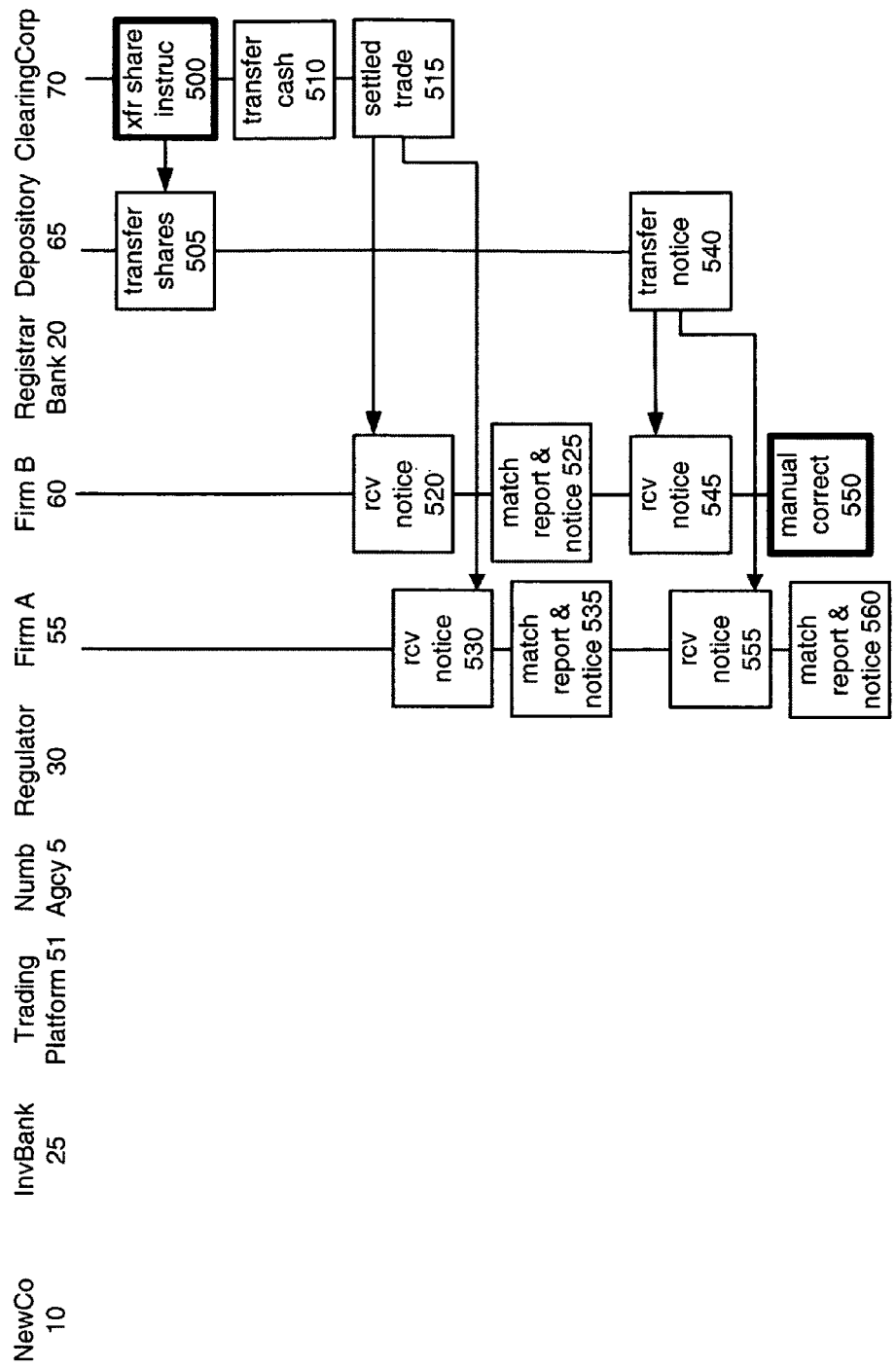
FIG. 6 is a flowchart showing a prior art settlement error.

FIG. 6 is a flowchart showing a prior art settlement error.

FIG. 6 is similar to FIG. 4, and for brevity, only differences will be discussed. In this case, assume that Newco 10 declared a stock dividend of one share per outstanding share, that is, the dividend will double the number of outstanding shares. Also assume that T+3 is the ex-dividend date. Firms 55 and 60 correctly understand that they should double the number of shares for the XYZ trade, from 100 shares to 200 shares. Assume, however, that clearing corporation 70 has made a mistake, such as by having received the incorrect date from a vendor in an automated manner or by having the incorrect date improperly recorded by a clerk from a manual process, and thinks that the ex-dividend date is T+4, not T+3.

In general, a financial enterprise may need to access sources of corporate event information globally from: stock exchanges; central depositories; commercial data vendors; issuer prospectuses; and press releases and newspapers. This is a massive amount of information that needs to be collated, validated, captured in codes and then put into a structured syntax that can be processed by a software application. For example, there are nearly 100 different types of corporate actions, and different laws dictate how each company must report this information. As business laws across different countries are not harmonized, the rights of shareholders pursuant to an event are not the same across different markets, thus making the communication of corporate events hard to standardize globally. Additionally, this information is required for adjustments to indexes, futures, options and derivative products that have securities underlying these instruments. Also, notification of these events, culled from these numerous sources, gets passed through a long chain from issuer and registrar, and on through sub-custodians, global custodians, the Depository Trust Company & Clearing Corp. (DTCC) here in the US, other (foreign) central depositories, vendors, broker/dealers, and investment managers.

Corporate event information arrives at an entity in varied formats from different data vendors, is sometimes confusing to understand, and at other times is incorrect when a particular data vendor made a mistake in converting manual data, such as press releases, to digital data. Because of this each entity typically obtains information from multiple but different data vendors and compares the obtained information to discover discrepancies, thereby preventing reliance on incorrect information. These discrepancies then have to be followed up on, usually through manual intervention back to the originating source, and repaired.

At step 500, clearing corporation 70 sends share transfer instructions to depository 65, to transfer 100 shares of XYZ from the account of firm 55 to firm 60. Because of the dividend, this is an error; clearing corporation 70 should have instructed depository 65 to transfer 200 shares of XYZ.

Steps 505-545 and 560 of FIG. 6 correspond to steps 305-345 and 360 of FIG. 4.

At step 550, firm 60 cannot match the share transfer notice for 100 shares with the execution report, as updated to reflect that it bought 200 shares. Accordingly, the share transfer notice is put on an automatically generated error report. Probably, the execution report also appears on an automatically generated error report, as being unmatched. A clerk at firm 60 hopefully realizes that the discrepancy in the number of shares is due to XYZ's dividend, and calls depository 65 and clearing corporation 70 to correct the error. Until the error is corrected, the clerk in firm 60 notifies trader B that the trade has not cleared, and trader B cannot trade the missing shares of XYZ, which could be highly disadvantageous in a fast moving market.

An example of trading on behalf of an institutional client will now be discussed.

Let it be assumed that Firm C (not shown) operates mutual fund AA, BB and CC, and has engaged investment manager 35 to trade for its mutual funds.

Firm C uses custodian bank 40 as custodian for its mutual funds. Custodian bank 40 outsources some of its data processing functions to financial industry post-trade data processor 45.

Investment manager uses firm 55 for its trades; during set-up of the trading account for investment manager 35, firm 55 was instructed as to the relationships of the parties.

Some time after the initial public offering of XYZ, investment manager 35 decides to sell 500 shares of XYZ for mutual fund AA, sell 200 shares of XYZ for mutual fund BB, and sell 500 shares of XYZ for mutual fund CC, that is, to sell a total of 1000 shares of XYZ.

Coincidentally, at the same time, trader B of firm 60 decides to buy 1000 shares of XYZ for the proprietary trading account of firm 60.

Figure 7A:
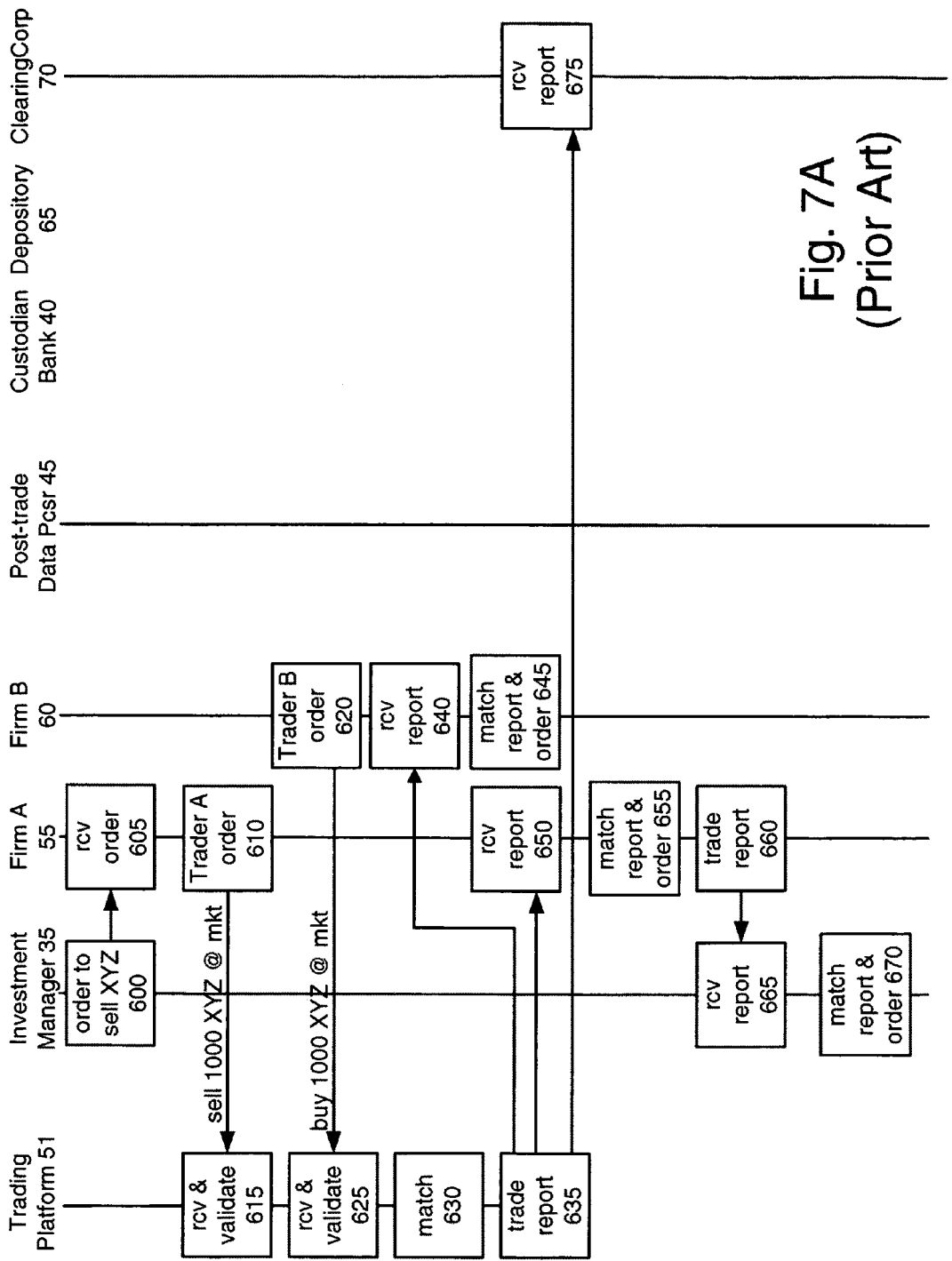
FIGS. 7A and 7B are a flowchart showing prior art trade day activity with customer trading.
Figure 7B:
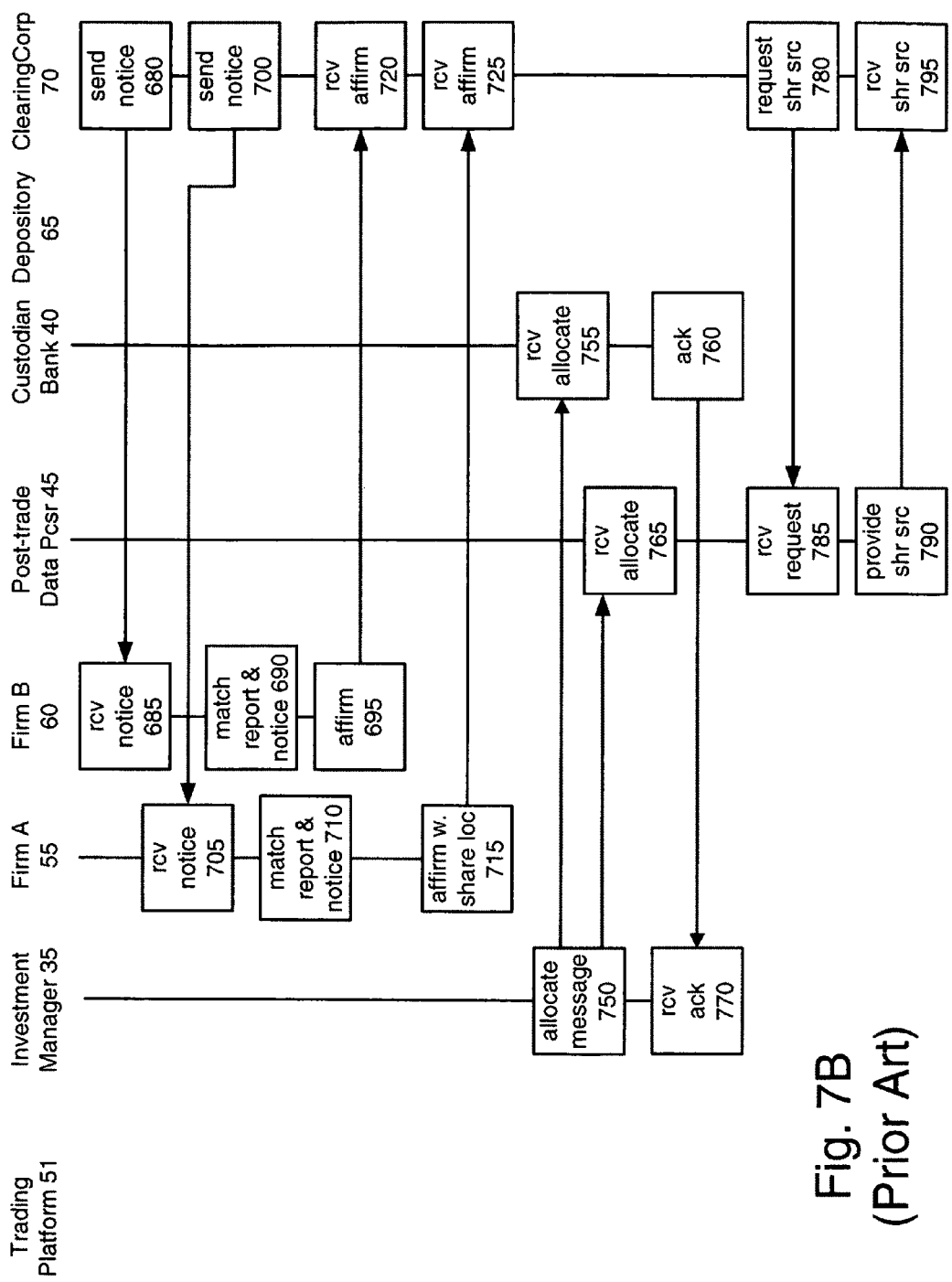

FIGS. 7A and 7B are a flowchart showing prior art trade day activity for this case of a sell side institutional trader and a buy side proprietary trader. FIGS. 7A and 7B are similar to FIG. 3, and for brevity, only differences will be discussed.

At step 600, investment manager 35 sends an order to sell 1000 shares of XYZ at the market price to firm 55.

At step 605, firm 55 receives the sell order from investment manager 35.

Steps 610-655 of FIG. 7A correspond to steps 210-245 of FIG. 3

At step 660, firm 55 sends a trader report to investment manager 35.

At step 665, investment manager 35 receives the trade report.

At step 670, investment manager 35 matches the trade report against its sell order.

Steps 675-710 of FIGS. 7A and 7B correspond to steps 250-285 of FIG. 3.

At step 715, firm 55 sends an affirm notice to clearing corporation 70, accepting the settled trade, and instructing clearing corporation 70 that financial industry post-trade data processor 45 will provide the account locations to be debited by depository 65.

At step 720, clearing corporation 70 receives the affirm from firm 60.

At step 725, clearing corporation 70 receives the affirm from firm 55, including the instruction to look to financial industry post-trade data processor 45 for share locations.

At step 750, which ideally occurs on T, but could occur as late as the morning of T+3, investment manager 35 sends an allocate message to custodian bank 40 and financial industry post-trade data processor 45, explaining how to allocate its 1000 share trade among mutual funds AA, BB and CC. While larger investment managers have fully computerized systems, smaller investment managers—such as single person firms— still use manual techniques for sending messages such as sending a handwritten fax.

At step 755, custodian bank 40 receives the allocate message, and at step 760, acknowledges receipt of the allocate message to investment manager 35.

At step 765, financial industry post-trade data processor 45 receives the allocate message from investment manager 35.

At step 770, investment manager 35 receives the acknowledgement from custodian bank 40.

In some embodiments, investment manager 35 communicates only with financial industry post-trade data processor 45, which in turn, provides daily position update reports to custodian bank 40.

At step 780, clearing corporation 70 sends a share source request to financial industry post-trade data processor 45.

At step 785, financial industry post-trade data processor 45 receives the share source request, and at step 790, provides the share source, that is, the account for firm C, to clearing corporation 70.

At step 795, clearing corporation 70 receives the share source instructions. The trade is now fully confirmed.

If investment manager 35 was slow about providing its allocate message, then although step 780, the request for share source from clearing corporation 70, occurred on T, financial industry post-trade data processor 45 would be unable to provide the share source at step 790 until as late as the morning of T+3.

Figure 8:
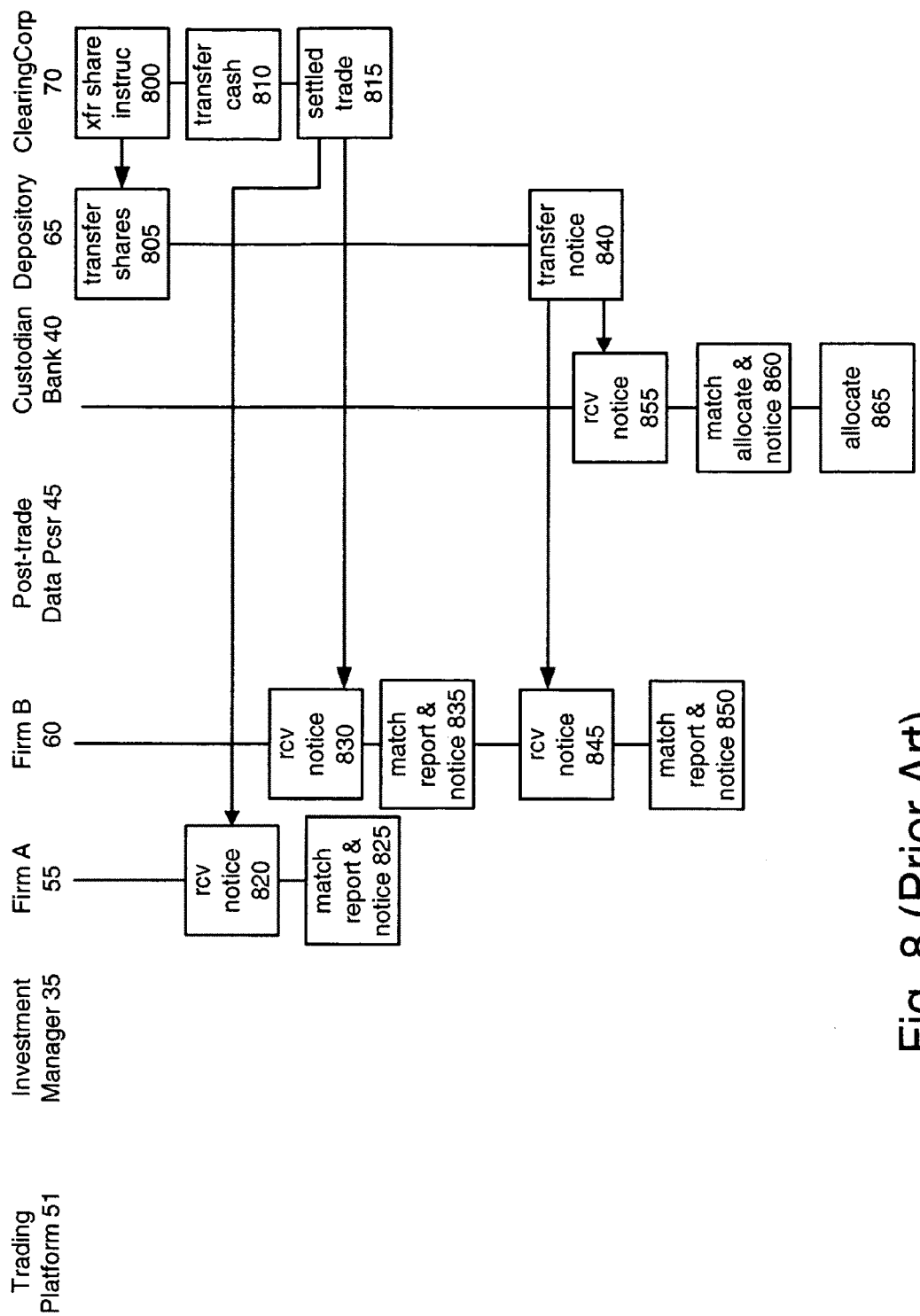
FIG. 8 is a flowchart showing prior art settlement day activity when a trading firm does not hold the securities that it sold.

FIG. 8 is a flowchart showing prior art settlement day activity for this case.

FIG. 8 is similar to FIG. 4, and for brevity, only differences will be discussed.

At step 800, clearing corporation 70 sends share transfer instructions to depository 65, to transfer 1000 shares of XYZ from the account of firm C to firm 60.

Steps 805-835 of FIG. 8 correspond to steps 305-335 of FIG. 4.

At step 840, depository 65 sends a share transfer notice to each of financial industry post-trade data processor 45 and firm 60.

Steps 845-850 of FIG. 8 correspond to steps 345-350 of FIG. 4.

At step 855, financial industry post-trade data processor 45 receives the share transfer notice.

At step 860, financial industry post-trade data processor 45 matches the share transfer notice with the allocation message, and concludes that the trade is fully and properly settled.

At step 865, financial industry post-trade data processor 45 updates its records for firm C to allocate the cleared shares to mutual funds AA, BB and CC, in accordance with the allocate message from investment manager 35.

Another instance of an error that occur in the prior art will now be discussed.

As in the proprietary account trading examples discussed above, it will be seen that due to the frequent matching of information regarding the progress of the trade, the errors are discovered, and are likely to be corrected. However, there is still a large cost for the manual processing required for errors. Furthermore, if the manual processing does not finish by T+3, a firm trading on behalf of a customer will have to borrow cash or stock to ensure settlement, which is costly and then may have to be reversed when error processing concludes.

It will be appreciated that other trading data errors also occur with similar consequences: the cost for manual error processing, and additional costs if the manual error processing does not complete by T+3. Furthermore, the delay in entering into a trade and then waiting three days or more for the finality of settlement and payment has inherent and systemic risk built into the entire end-to-end process. Significant risk of default is associated with a firm or client involved in the transaction declaring bankruptcy during the transactions life cycle. Also cash flows from other markets that are surrogates for stocks, such as options or futures have shorter trade-to-settlement/payment life cycles; even certain markets such as government securities markets settle in real-time, while available earlier cannot be offset from stock markets cash flows until three days forward. This causes significant overnight borrowing to synchronize these cash flows with the potential of bank defaults.

Figure 9:
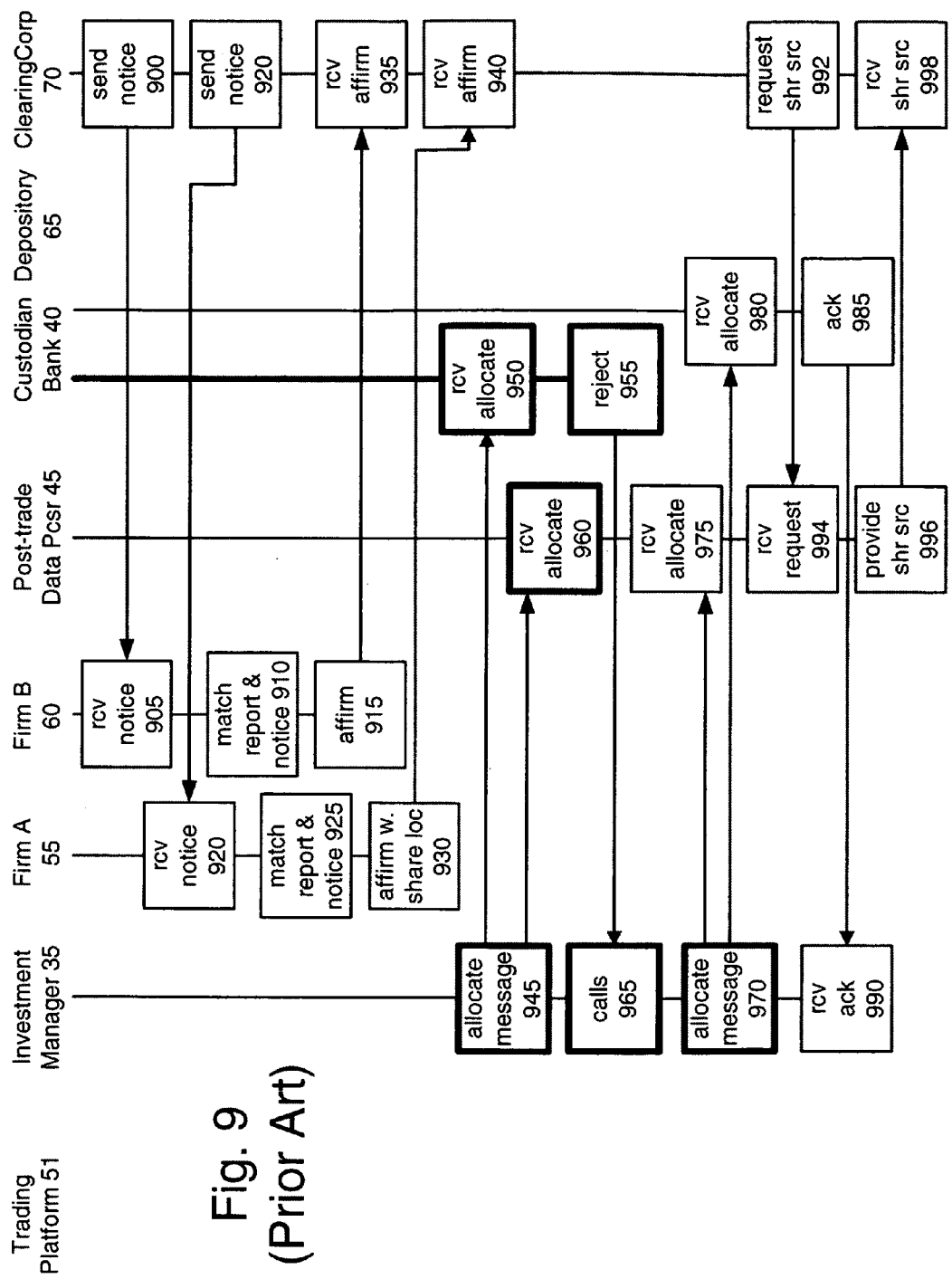
FIG. 9 is a flowchart showing another prior art clearing error.

FIG. 9 is a flowchart showing another prior art clearing error.

FIG. 9 is similar to FIG. 7B, and for brevity, only differences will be discussed.

In this case, the error is that investment manager 35 has the wrong custodian bank associated with mutual funds AA, BB and CC. This can easily occur if firm C changes its custodian bank from another bank to custodian bank 40, but forgot to tell its outside investment manager 35. Or, firm C could send a notice of change of custodian bank to investment manager 35 who could not get around to updating its records.

Steps 900-940 of FIG. 9 correspond to steps 680-725 of FIG. 7B.

At step 945, which ideally occurs on T, but could occur as late as the morning of T+3, investment manager 35 sends an allocate message to another custodian bank (not shown in FIG. 1), namely, the old custodian bank, and to financial industry post-trade data processor 45, explaining how to allocate its 1000 share trade among mutual funds AA, BB and CC.

At step 950, the other custodian bank receives the allocate message, and at step 955, sends a reject message back to investment manager 35.

Step 960 of FIG. 9 corresponds to step 765 of FIG. 7B.

At step 965, investment manager 35 receives the reject from the other custodian bank. Investment manager 35 now has to figure out why the reject occurred. For small investment managers, this could take a few days, as they may not have dedicated clerical staff, that is, the investment manager may do his or her own error handling, and if the investment manager is on vacation while the error occurs, they will not get around to dealing with the error in the normal trade processing cycle. In this case, let it be assumed that investment manager 35 promptly calls firm C, to confirm the identity of the custodian bank, and learns that the custodian bank has changed to custodian bank 40.

At step 970, investment manager sends a corrected allocate message to custodian bank 40 and to financial industry post-trade data processor 45.

At step 975, financial industry post-trade data processor 45 receives the corrected allocate message.

At step 980, custodian bank 40 receives the allocate message and at step 985, sends an acknowledgement message to investment manager 35.

At step 990, investment manager 35 receives the acknowledgement from custodian bank 40.

Steps 992-998 of FIG. 9 correspond to steps 780-795 of FIG. 7B.

The above three cases of prior art errors illustrate how the errors were noticed and corrected.

Other prior art error can occur that are not even noticed, and therefore do not get corrected. Actions depending on the uncorrected data will thus be based on erroneous information, and so the actions taken may be wrong.

Two examples of unnoticed and uncorrected errors will now be discussed. The first relates to intra-firm data aggregation that is used for risk management. The second relates to data aggregation used for regulatory awareness of the financial industry.

Figure 10:
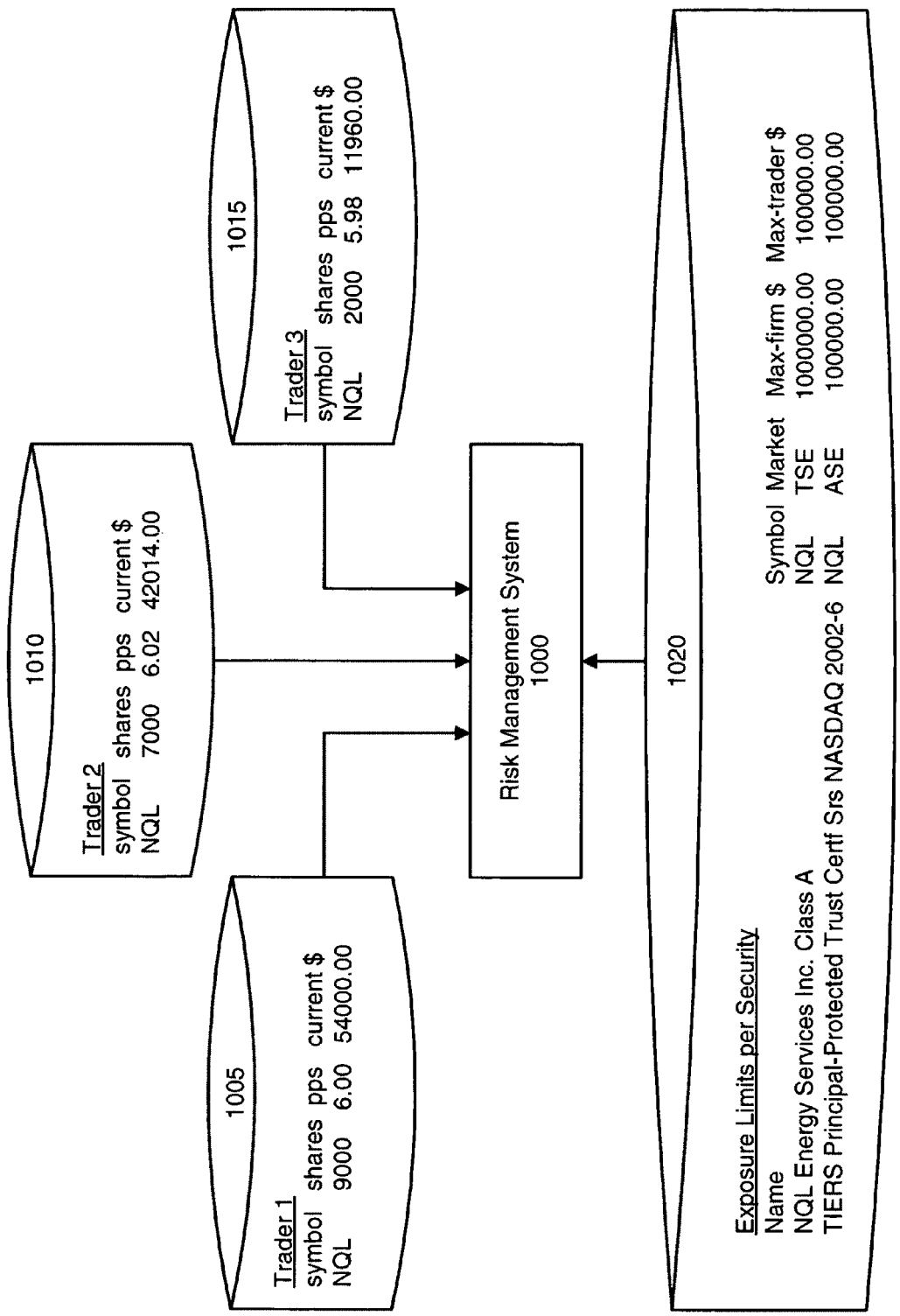
FIG. 10 is a flowchart showing a problem with prior art intra-firm data aggregation.

FIG. 10 is a flowchart showing a problem with prior art intra-firm data aggregation.

In this case, let it be assumed that a firm trading for its own account, such as a hedge fund, has a risk management system with two position limits for security, indicating how big a position can be taken by an individual trader in the security, and how much overall exposure the firm will tolerate for the security.

As sometimes occurs, different trading marketplaces assign the same symbol to different securities, since there is no overall coordination of symbol assignment. For instance, the symbol NQL on the Toronto Stock Exchange trading platform corresponds to the security NQL Energy Services Inc. Class A stock, while the symbol NQL on the American Stock Exchange trading platform (owned by NYSE Euronext) corresponds to TIERS Principal-Protected Trust Certificate Series NASDAQ 2002-6 security.

The firm has risk management system 1000 with database 1020 showing the two position limits for each security, and has correctly represented that NQL corresponds to two different securities, and has different position limits for overall firm exposure for these two securities.

The trades of traders 1, 2 and 3 are in databases 1005, 1010 and 1015, respectively. These traders each have one position in NQL, but have not specified which NQL their position is for.

In this example, the positions of traders 1, 2 and 3 are consistent with the individual trader position limits for both NQL, so no alarms are triggered.

If risk management system 1000 is programmed to aggregate unspecified NQL positions as NQL:TSE, then no alarms will be triggered, as the sum of the positions of traders 1, 2, 3 is less than the overall firm limit for NQL:TSE.

However, if traders 1, 2 and 3 each have positions in NQL: ASE, then the firm's overall exposure has been exceeded, and an alarm should be triggered in risk management system 1000. But, no alarm occurs. Accordingly, the firm's management believes their risk is properly contained, whereas in reality, their risk is more than they want. However, no one in the entire firm is aware of the problem, and all systems appear to be operating properly and all traders believe their exposure is as desired by the firm's management.

This is an illustration of the existence of an intra-firm problem that exists, but is not recognized.

Figure 11:
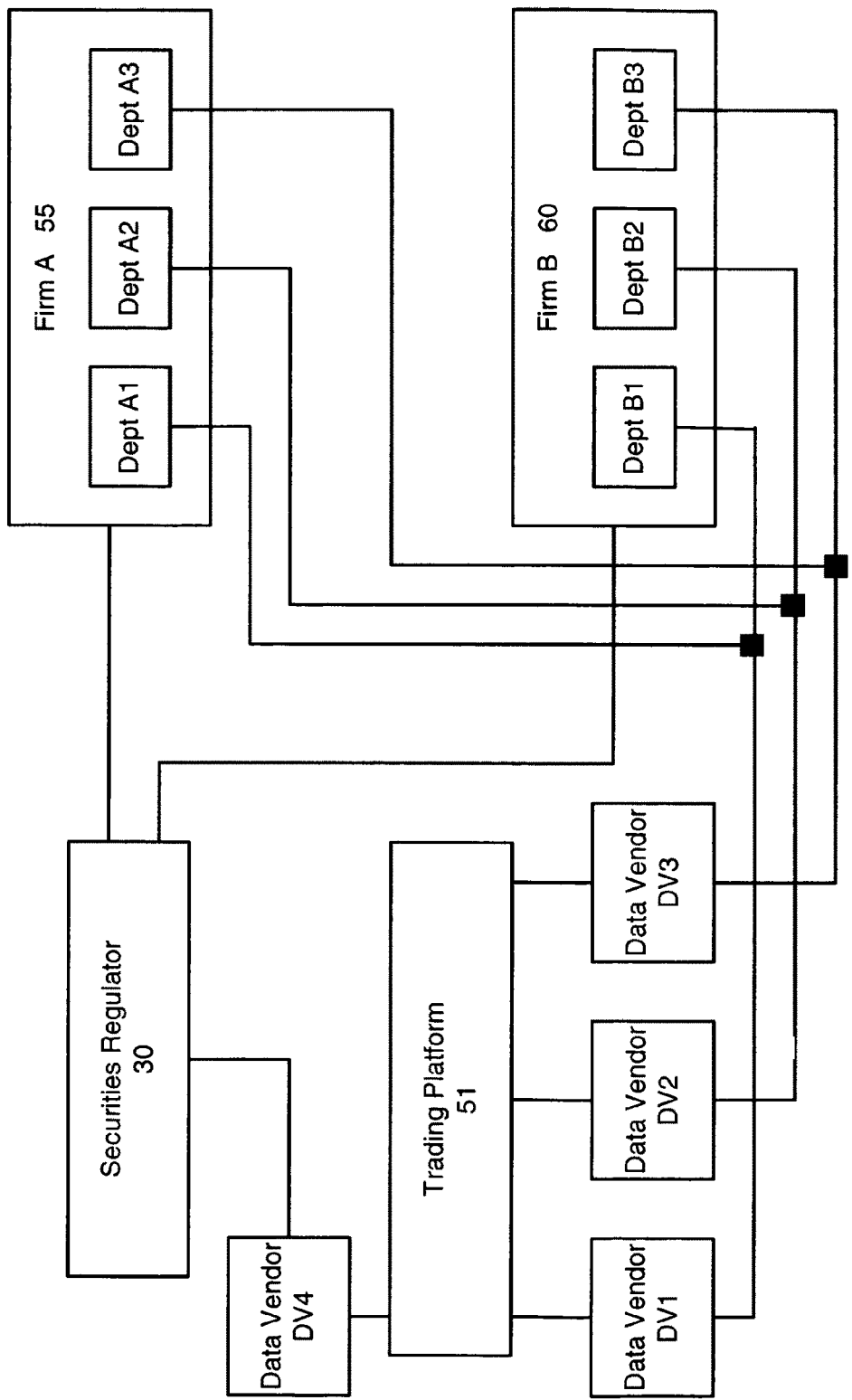
FIG. 11 is a block diagram showing another prior art hardware and communication configuration.

FIG. 11 is a block diagram showing another prior art hardware and communication configuration.

Trading platform 51 supplies its market data to data vendors DV1, DV2, DV3 and DV4.

Firm 55 has departments A1, A2 and A3 that are respectively supplied with data from data vendors DV1, DV2 and DV3. For example, department A1 might be a proprietary trading securities group and appreciates the stock charting features in the data feed from data vendor DV1; department A2 might be retail trading, and gets only "bare bones" market data from data vendor DV2; while department A3 might be another proprietary trading group focused on derivatives that uses the underlying security market data from data vendor DV3 along with its derivative market data.

Firm 60 has departments B1, B2 and B3 that are respectively supplied with data from data vendors DV1, DV2 and DV3.

Securities regulator 30 requires daily position reports from firms 55 and 60, and then uses market data from data vendor DV4 to convert the positions to cash exposures, which are compared against the reserve capital for the firm, to understand its leverage.

Figure 12:
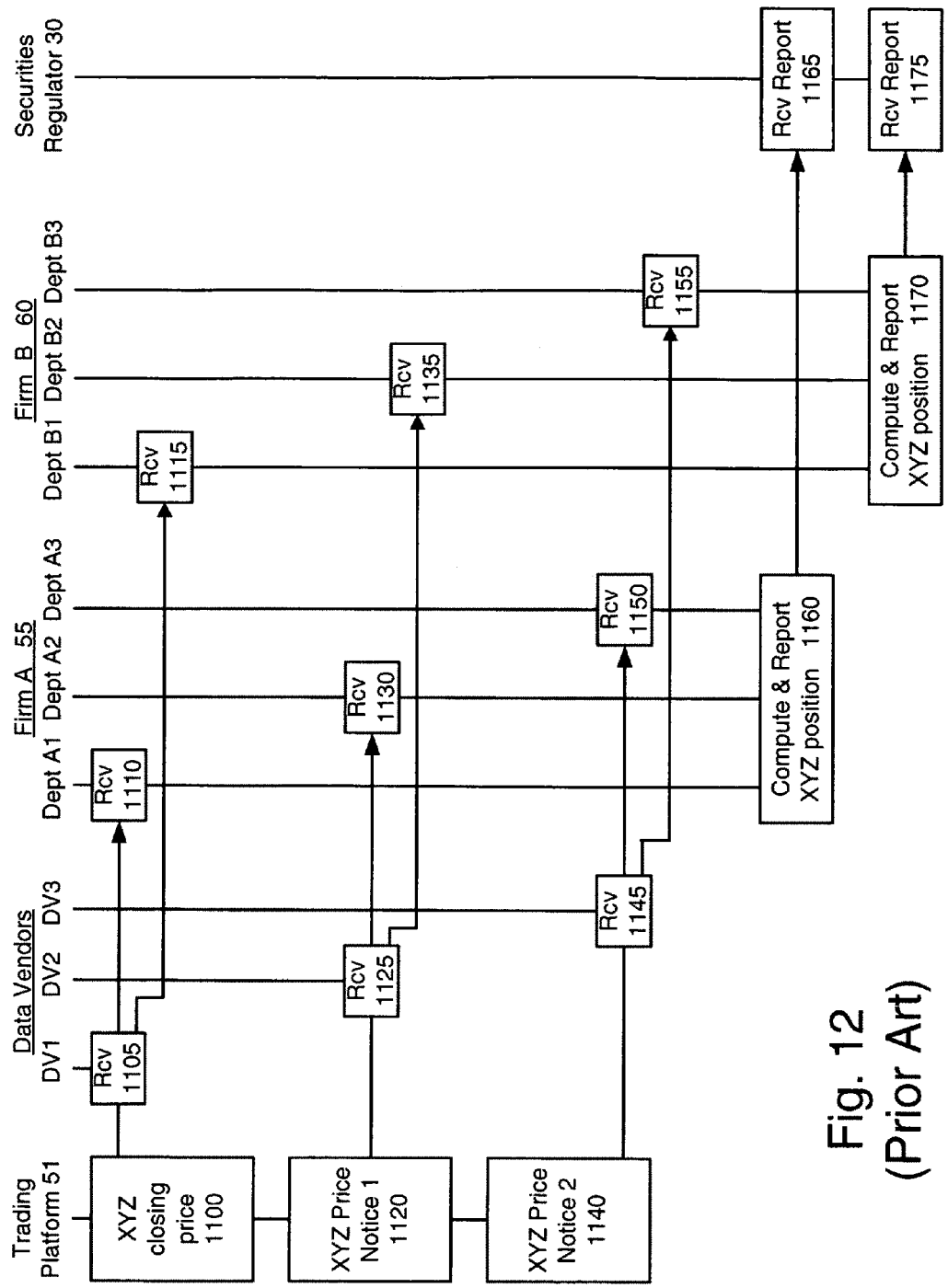
FIG. 12 is a flowchart showing a problem with prior art inter-firm data aggregation.

FIG. 12 is a flowchart showing a problem with prior art inter-firm data aggregation.

Each trading platform reports a "closing price" for its daily trading. The closing price is usually the same as the price at which the last trade occurred. However, each trading platform can define its closing price according to its own rules, for example, as the average of the price at which the last three trades of the day occurred.

The closing price is also referred to as a "last sale price" or a "valuation price". The closing price is very important, as most investors perform daily mark-to-market valuations of their investments using the closing price for their securities.

There are hundreds of trading platforms in the world, nearly 80 trading platforms are in the United States. Various data vendors receive the closing prices from some or all of the trading platforms, and in turn, generate and distribute, at the end of each trading day, a closing price data feed. However, the various data vendors do not always report the same closing price for a particular security at a particular trading platform, for myriad reasons, including (a) the vendor has installed a new software interface that does not properly handle closing prices, (b) the vendor failed to get a price adjustment notice from a trading platform, (c) the vendor's internal cut-off time for assembling data for its closing price data feed was earlier than the time that the trading platform issued an adjusted closing price and so the vendor will report the adjustment on the next day, and so on.

At step 1100, trading platform 51 reports a closing price for XYZ on a particular day.

Then due to corrections made at trading platform 51, at step 1120, trading platform 51 reports a first corrected closing price as part of its market data information.

Due to further corrections made at trading platform 51, at step 1140, trading platform 51 reports a second corrected closing price as part of its market data information.

For instance, Notice 1 averaged the last three prices of the day, given that the last price was of a disputed trade price far from the previous last trade. The last price was left standing but averaged in and recalculated in a new valuation price. Notice 2 changed the valuation price a second time as it was usual for floor governors to review immediate closing price judgments, this time removing the disputed last trade, thus leaving the previous trade as the last trade and defining it as the valuation price.

At step 1105, data vendor DV1 receives the original valuation price, and distributes it to departments A1 of firm 55 and B1 of firm 60.

At step 1125, data vendor DV2 receives the notice 1 price, and distributes it to departments A2 of firm 55 and B2 of firm 60.

At step 1145, data vendor DV3 receives the notice 2 valuation price, and distributes it to departments A3 of firm 55 and B3 of firm 60.

Here, the error is that the data vendors did not all pick up all of the corrections. Accordingly, their closing prices differ.

At steps 1110, 1130 and 1150, departments A1, A2 and A3 receive the respectively different closing prices. At step 1160, firm 55 computes its overall XYZ position and reports it to regulator 30. At step 1165, regulator 30 receives the position report from firm 55.

At steps 1115, 1135 and 1155, departments B1, B2 and B3 receive the respectively different closing prices. At step 1170, firm 60 computes its overall XYZ position and reports it to regulator 30. At step 1175, regulator 30 receives the position report from firm 55.

In a further step (not shown), regulator 30 uses the data from data vendor DV4 to calculate overall positions based on the reports from firms 55 and 60. At best, the closing price from DV4 matches one of the closing prices from one of the vendors DV1, DV2, DV3, and is the correct (notice 2) price. However, data vendor DV4 could also have the wrong price.

Of concern is that regulator 30 does not know that the data from the various firms are internally incommensurate, and further does not suspect that its selected data vendor DV4 may compound errors.

This is an illustration of the existence of an inter-firm problem that exists, but is not recognized.

The CCDM will now be described.

Figures 13, 14:
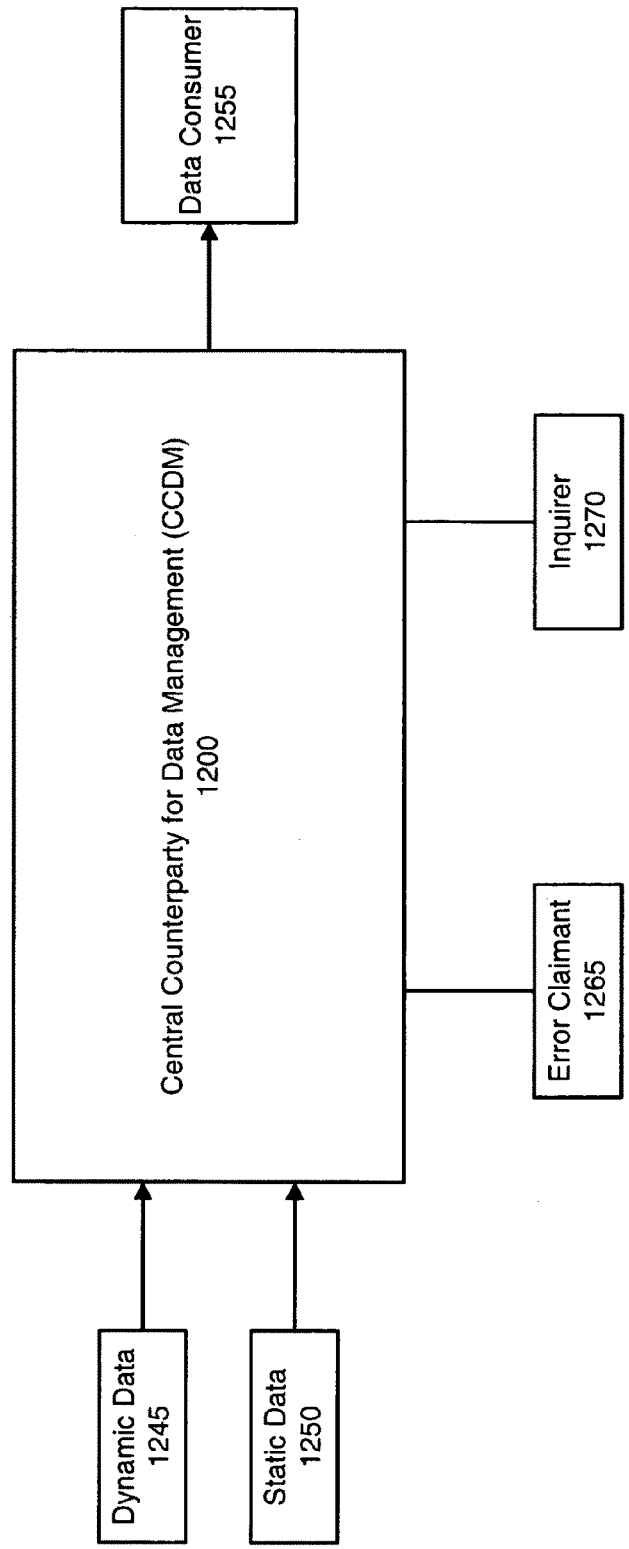
FIG. 13 is a diagram referred to in explaining financial transaction data.
FIG. 14 is a block diagram showing the logical functions of a Central Counterparty for Data Management (CCDM)

FIG. 13 shows an organization of financial transaction data. Broadly, transaction data can be grouped into static data representing something that rarely or never changes, and dynamic data representing a transaction. Each of these groups can be further grouped into the original data item, and updates to the data item. All of this data is sometimes referred to as "reference data". All of this data is eligible for inclusion in the CCDM.

A financial transaction becomes associated with additional reference data as it moves through its life cycle. For instance, a trader may decide to "buy 100 XYZ at 21.54", then the trader's order entry system associates "XYZ" with "Newco common stock", and associates "21.54" with "US dollars". Here, the full name of the security is an instance of reference data, and the currency is another instance of reference data. The order entry system then selects trading platform TP1 because of an order flow rebate arrangement that the trading firm has negotiated with that trading platform, and associates "sent to trading platform TP1" with the order. At trading platform TP1, the buy order is matched with a sell order, and the trading platform associates "trade date/time" information, "sale price" information and "counterparty" information with the transaction. Additional reference data may be appended to the transaction during clearance and settlement.

Financial transactions, which increasingly are exclusively information based, are represented as a series of data elements that collectively represent their unique unalterable attributes, referred to as static data; their occasional adjustments, as in corporate events or changes of corporate ownership; and their variable transaction components such as traded date, quantity and price. The unalterable characteristics and occasional adjustments, collectively termed reference data, uniquely identifies the product (security number and market), its unique structure (financial attributes), its manufacturer (counterparty, dealer or exchange), its delivery point (delivery or settlement instructions), its valuation price (closing or settlement price), its currency, and its expected delivery time.

So called high-frequency traders locate their computers physically near to the computers of trading platforms, to minimize transmission delays. The trading platforms typically charge extra for the so-called low latency data provided to the co-located computers of the traders. The low latency data is not well suited for the CCDM. However, the trading platforms provide the same data at normal latency, and the normal latency version of the trading data is well suited for the CCDM.

Reference data uniquely identifies a financial product (security number, symbol, market, etc.), its unique type, terms and conditions (asset class, maturity date, conversion rate, etc.), its manufacturer or supply chain participant (counterparty, reference entity, dealer, institution, exchange, etc.), its delivery point (delivery, settlement instructions and location), its delivery or inventory price (closing or settlement price) and its currency. Analogous to specifications for manufactured products, reference data also defines the products' changing specifications (periodic or event driven corporate actions) and seasonal incentives or promotions (dividends, capital distributions and interest payments)

Conventionally, reference data is attached incrementally at various stages in the life cycle of a financial transaction, either by the selection or input of such information by a human being, by looking up information on a computer file, if it is being entered for the first time, or through computerized access to previously prepared directories and/or financial transactions as when one had previously bought a stock and then prepares to sell it. Reference data occurs beginning in pre-trade assembly through to final settlement and payment.

The closing price is an example of reference data.

The current practice of acquiring, cleansing and storing reference data is to disassemble by manual means the elemental details present in a prospectus, offering memorandum, financial event announcement, incorporation or business organizational documents, ISDA master agreement, and other such paper documents. For example for a financial event announcement i.e. a tender offer, a merger, a dividend announcement, in this instance sent as a press release or transmitted as text as shown in Table 1, the text must be parsed manually and placed in formatted context for input to a computer.

TABLE 1

Unstructured Corporate Event Notification

OPT:01:"ELECTRONIC DATA SYSTEM CORPORATION"
UPDTEXT:6432511::#:0099: "SMK INFORMATION SERVICES"
EXTENDED THE OFFER TO PURCHASE SHARES OF ELEC-
TRONIC DATA COMMON STOCK FROM HOLDERS OF 99
OR FEWER SHARES HELD AS OF RECORD DATE SEP.
20, 2002, UNTIL SEP. 18, 2003, TERMS: HOLDERS WILL
RECEIVE CASH AT A RATE TO BE DETERMINED AT THE
CLOSE OF BUSINESS ON THE DATE OF TRANSFER, LESS A
PROCESSING FEE OF $1.50 PER SHARE: THE OFFER WILL
EXPIRE ON JUL. 18, 2003 (05:00 PM EDT). THERE IS NO PRO-
TECT PERIOD OR WITHDRAWAL PRIVILEGE AVAILABLE.
NOTE: HOLDERS MAY PURCHASE ADDITIONAL SHARES
TO REACH 100 AT A DEPOSIT PRICE TO BE DETERMINED,
PLUS A $1.50 PER SHARE PROCESSING FEE. THE OFFER IS
NOT REGISTERED WITH THE SEC. A MAXIMUM NUMBER
OF 10,000 SHARES PER WEEK WILL BE ACCEPTED ON A
FIRST COME, FIRST SERVE BASIS

This process is performed by a myriad of commercial data vendors as well as directly by financial institutions. In many instances multiple interpretations of what is assumed to be the same data is created. These multiple sources are bought by financial institutions from these vendors, often in proprietary formats and inconsistent identification, and matched within a financial institution to determine discrepancies in order to create a golden copy. Because there are multiple identifiers for the same security or business an extensive mapping exercise is required within each financial institution or through commercial mapping services to conform a single representation of the elements of each security or business, or financial event relating to either.

Reference prices for some non-exchange traded instruments are aggregated and distributed by their dealer associations, others have no central mechanism for aggregation and are either left to individual firms "calling around" to get dealers' prices, or left to entrepreneurs to build an aggregation and distribution service. Still other financial instruments, which either trade infrequently, or are not expected to trade at all, are priced through formula. Municipal bonds and over-the-counter derivatives are examples, requiring such reference data as credit ratings, historical prices, calendar data, etc., as inputs to these calculations.

Conventionally, reference data can be accessed via each business's processing application so as to incorporate the required reference data according to the specific business rules for the transaction to be represented as a stock trade, bond trade, futures trade, swap, credit derivative, etc. Sometimes the business application accesses its own data base of reference data, each financial institution usually having multiples of reference data bases. Sometimes there is a central store of reference data within the organization, sometimes an external store as when such information is outsourced.

The problem, simply stated is that each financial institution, each separate business unit within a financial institutions and/or each supply chain intermediary has independently sourced, stored and applied reference data to their own copy(s) of their individual or master inventory and counterparty data bases. When this is applied to the variable components of a financial transaction (i.e. transaction specific data such as quantity and transaction price), and an attempt made to match, identically, the details sent by the counterparties and supply chain participants in order to accept and pay for the transaction, significant failures in matching occurs as explained above.

Conventionally, various parties attempted to collect and/or rationalize the reference data after it was in use.

In contrast, CCDM 1200 is either the source of reference data, or receives the reference data immediately after its creation. In other words, prior art solutions for reference data employed a back-end approach, whereas CCDM 1200 employs a front-end approach.

In some embodiments, CCDM 1200 reformats data received from external parties into an internal storage format in which the data is associated with metadata. The reformatting process is sometimes referred to as "normalizing" the data. Metadata is informational data about content data, that is, informational data indicating what the content data means.

Extensible markup language (XML) schemes are well-known for financial data, including: Extensible Business Reporting Language (XBRL), Extensible Financial Reporting Markup Language (XFRML), Financial Information Exchange Markup Language (FIXML), Financial Products (Derivatives) Markup Language (fpML), Fixed Income Markup Language (FinXML), Investment Research Markup Language (IRML), Mortgage Bankers Association of America (MISMO XML), Market Data Definition Language (MDDL), Open Financial Exchange (OFX), Mortgage Industry Architecture (MIXA), Society for Worldwide International Financial Transactions Markup Language (SWIFTML).

A typical XML message format is shown in Table 2.

TABLE 2

```
<Counterparty>
    <Type>Institution</Type.
    <Name>"ABC Financial"</Name>
    <Identificationnumber>999-99-9999</Identificationnumber>
    <Addressline1>1313 Quincy Avenue</Addressline1>
    <Cityormunicipality>Boston</Cityormunicipality>
    <Stateorprovince>MA</Stateorprovince>
    <Ziporpostalcode>12345</Ziporpostalcode>
</Counterparty>
```

Examples of markup language terms are: <Name> and </Name>.

Many schemes exist for describing financial data. For example, the date "Sep. 20, 2001" is represented in different schemes as follows:

FIX syntax          75 = 20010920
FIXML syntax        <TradeDate>20010920</TradeDate>
SWIFT 15022 syntax 98A::TRAD//20010920    FIG. 14 is a block diagram showing the logical operation of CCDM 1200.

CCDM 1200 operates as a utility for the financial industry.

CCDM 1200 comprises at least one general purpose computer, including memory, storage, data transmission, displays and other peripherals so as to operate as described herein. The equipment used for CCDM 1200 is conventional and various forms and configurations thereof are well-known to those of ordinary skill in the art.

CCDM 1200 is adapted to receive financial transaction data, store it, possibly reformat it, and retransmit it as part of its data feed. Generally, CCDM 1200 is concerned with commoditized data, rather than the proprietary high value analytic data sold by various data vendors. Dynamic data source 1245 and static data source 1250 each provide data to CCDM 120. In turn, CCDM 1200 provides dynamic and/or static data feed(s) to data consumers 1255. Note that sources of one type of data may be consumers of another type of data.

Fix Protocol Ltd created the Financial Information Exchange (FIX) protocol to standardize the communication of pre-trade and trade information. Since 1995 it has allowed counterparties and supply chain participants in capital market transactions to communicate electronically such information as indications of trading interest, placement of orders, receipt of executions, and the allocation and confirmation of trades for delivery and payment.

In some embodiments, CCDM 1200 generates its data feeds with incorporated metadata, such as a markup language.

Historically, data feeds have used the position of information to indicate its meaning; this opens the door to errors. It is better practice to associate metadata with the data, greatly reducing the chance of errors.

CCDM 1200 is further adapted to receive inquiries and respond thereto. Inquiries are either standing inquiries or one-time inquiries. A standing inquiry persists until it is cancelled and usually results in multiple responses over time from CCDM 1200. A one-time inquiry results in one response from CCDM 1200. Inquirer 1270 submits an inquiry to CCDM 1200, and CCDM 1200 responds thereto.

CCDM 1200 is also adapted to receive requests for error reimbursement for errors relating to the data distributed by CCDM 1200. As described below, the error activity is used in an internal risk management process to adjust the reserve capital for CCDM 1200. Error claimant 1265 submits an error reimbursement request, and CCDM 1200 responds thereto.

Figure 15:
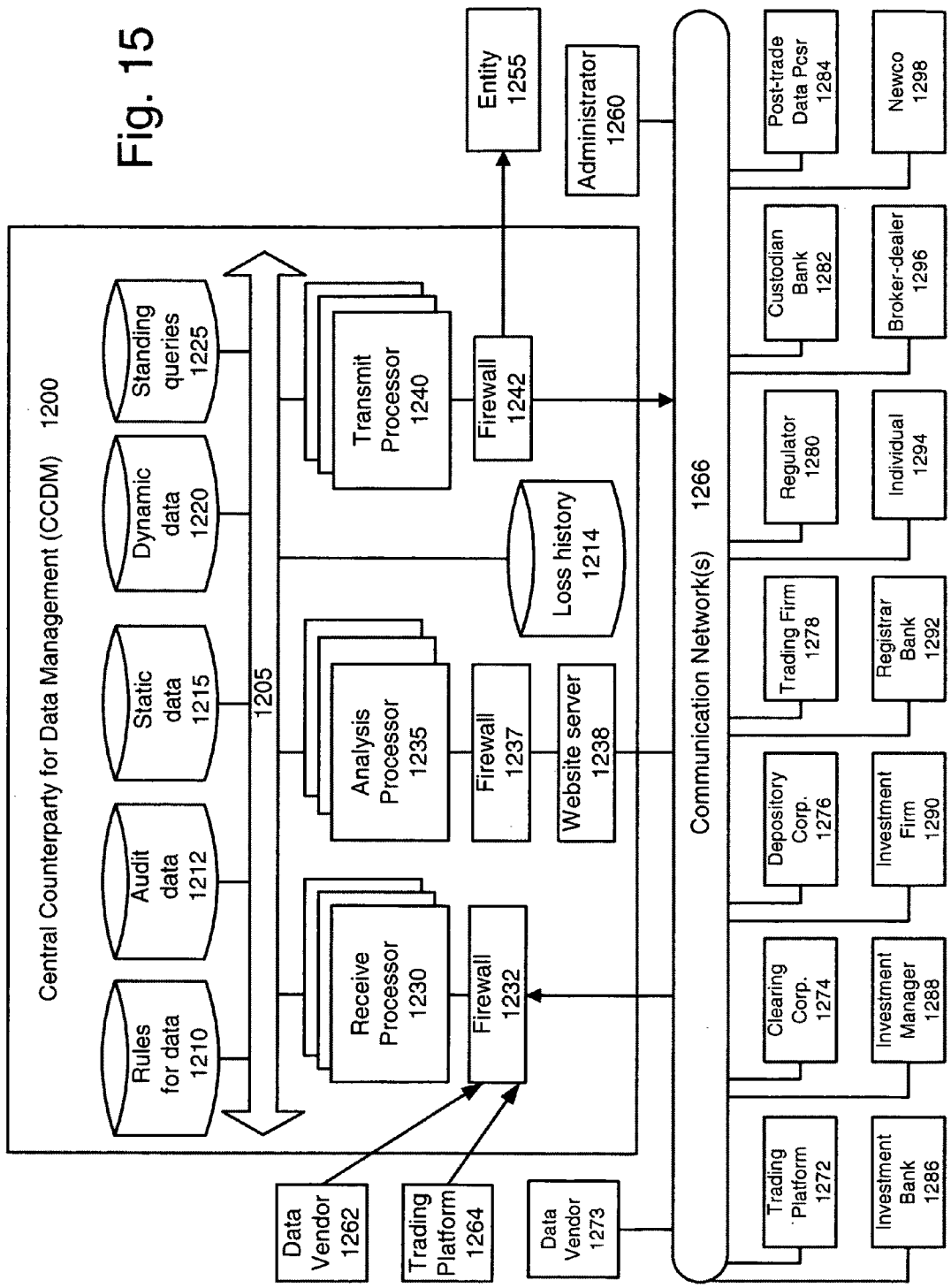
FIG. 15 is a block diagram showing a hardware and communication configuration for a first embodiment of a CCDM.

FIG. 15 is a block diagram showing a hardware and communication configuration for CCDM 1200.

CCDM 1200 includes high speed data bus 1205 enabling its internal modules to communicate with each other at high speed. In some cases, CCDM 1200 has computers located in different cities, and high speed data bus 1205 may be configured to bridge between the computers located in different cities.

CCDM 1200 includes rules data 1210, audit data 1212, loss history data 1214, static data 1215, dynamic data 1220 and standing queries 1225. The data maintained by CCDM 1200 is sometimes referred to as its data pool. The data for CCDM 1200 is discussed further below.

Loss history data 1214 includes problems for which CCDM 1200 provided error reimbursement, and problems for which CCDM 1200 did not provide error reimbursement. Loss history data 1214 includes the occurrence, frequency, reason and resolution of mismatched pre-trade and post-trade financial transactions.

Vendor Data Pools are of special interest as they can be a source of inconsistent and incorrect information as the information may be obtained from multiple sources, each different from the other. Such errors can occur for valuation prices, in financial event data, and in business entities and their legal hierarchies. This can lead to different valuations for the same financial instrument, different payments for an asset that has accrued a dividend, and in different reporting aggregations of a business' credit limit or risk exposure by using erroneous legal entity identities or associations.

CCDM 1200 acquires inconsistent, perhaps incorrect reference data from such Vendor Data Pools, from governments and regulators, from financial institutions (i.e. exchanges, clearing houses, settlement facilities, securities depositories, electronic dealers, electronic trading networks, national numbering associations, accredited trade associations, etc.) and from regulated electronic distributors of reference and market data such as Securities Information Providers (US) and Multilateral Trading Facilities (EC), and using its data rules 1210, eliminates or reduces the inconsistency in the data prior to storing it in its own data pool.

In particular, CCDM 1200 automatically associates metadata with data received from data vendors. The metadata enables disparate data to be understood as disparate, and further enables commensurate data to be understood as commensurate. For instance, a price could appear different from different data vendors, but once currency conversion is considered, the price becomes commensurate across data vendors.

CCDM 1200 automatically stores the reference data matched with a U3id, reducing opportunities for error. For instance, CCDM 1200 generates a U3id for each corporate action, and maintains, in dynamic data 1220, a history of corporate actions that can be indexed using their U3id.

CCDM 1200 matches reference data contained within pre-trade configured financial transactions received from broker-dealers, asset managers and custodians to the aggregated plurality of reference data stored on data storage devices. The matching comprises constructing an index from the U3id reference data contained within the pre-trade configured financial transactions, and accessing the previously stored reference data, and matching the retrieved reference data to the reference data contained within the pre-trade configured financial transactions.

Where the U3id data does not match no retrieval will be available and CCDM 1200 stores an indicator that no match has occurred. Where no match has occurred, the computer processing modules will attempt to match each component of the plurality of reference data stored on the computer storage devices, based upon a predetermined sequence of the individual reference data elements contained in the pre-trade configured financial transactions (i.e. financial instrument ID, Symbol, market, et al)

Where matches do occur a tag number will be calculated and logged within the CCDM Data Pool, and the validated, matched pre-trade configured transactions with all requested and validated reference data will be routed to the originator of the transaction.

CCDM 1200 distributes a notice of mismatched pre-trade configured financial transactions back to broker-dealers, asset managers, custodians and others, in accordance with rules provided by such entities.

CCDM 1200 enables broker-dealers, asset managers, custodians and others to communicate with computer storage devices a sub set of reference data now contained within post-trade financial transactions Message profiles (standing queries) are created by broker-dealers, asset managers, custodians, and other users and commercial redistributors of reference data, for determining general or specific content, as contained within post-trade financial transactions, to be matched to computer storage devices storing a plurality of reference data.

Where U3id matches do occur CCDM 1200 calculates a tag number and logs it, and sends the validated, matched post-trade transaction with all requested and validated reference data to the originator of the transaction.

Where the data does not match no retrieval will be available and CCDM 1200 stores an indicator that no match has occurred. Where no match has occurred, CCDM 1200 attempts to match each component of the plurality of reference data stored on the computer storage devices, based upon a predetermined sequence of the individual reference data elements contained in the post-trade financial transactions i.e. financial instrument ID, client (business entity) ID, supply chain ID (clearing location ID, settlement depot ID), etc.

CCDM 1200 is usually embodied in a multi-processor configuration, where each processor is a general purpose computer configured to perform selected operations. CCDM

1200 includes one or more receive processors 1230, one or more analysis processors 1235 and one or more transmit processors 1240, each configured with suitable memory, storage and communications facilities to operate as described herein.

Receive processor 1230 is adapted to receive data, store the received data, and notify transmit processor 1240 that new data is available to be transmitted. External data is provided to receive processor 1230 via firewall 1232. External data may be provided to firewall 1232 via dedicated communication facilities, as is appropriate for high density data sources such as trading platform 1264 and data vendor 1262, which are instances of dynamic data source 1245 and static data source 1250 shown in FIG. 14. Firewall 1232 may also receive external data from public communications network 1266 such as the Internet, and from virtual private networks operating via public communications network 1266.

Public communications network 1266 includes wire line and wireless communications facilities, supports data transmission in clear text or encrypted form, and includes circuit-switched and packet switched communication channels.

Transmit processor 1240 is adapted to receive notifications from receive processor 1230 that data is available for transmission, and to transmit the data to data consumers 1255. The data may be included in the notification of its availability, may be sent directly from receive processor 1230, or may be retrieved from a database coupled to high speed data bus 1205. Transmission occurs via firewall 1242. Transmission may be via dedicated communication facilities, as is appropriate for a data feed, a high density stream of data, provided to entity 1255 such as a data vendor, a trading platform or a large trading firm. Transmission may alternatively be by public communications network 1266.

Analysis processor 1235 is adapted to receive queries and to respond thereto, generally guided by data rules 1210. Analysis processor 1235 is coupled to firewall 1237 that is in turn coupled to website server 1238 that is coupled to public communications network 1266.

Website server 1238 provides one or more web sites accessible through public communications network 1266. One portion of website server 1238 requires a password and sometimes additional authentication to access its pages. Another portion of website server 1238 responds to public, anonymous inquiries. Generally, website server 1238 has a predefined set of web pages that it serves to visitors, and is capable of dynamically creating web pages as needed during a dialog with visitors. Some web pages provide dynamic data in a streaming format. Website server 1238 operates according to a suitable protocol, such as hypertext transfer protocol.

Although only one instance of each of firewalls 1232, 1237, 1242 is shown, it will be understood that many instances may be provided, as is appropriate for the data volume. Each of firewalls 1232, 1237, 1242 includes at least one communication interface, and at least one processor, and further includes suitable memory and storage for operating as described herein.

The following external entities are shown as coupled to public communication network 1266, and thus are able to communicate with CCDM 1200:

trading platform 1272, corresponding to trading platform 51 of FIG. 1, data vendor 1273, clearing corporation 1274, corresponding to clearing corporation 70 of FIG. 1, depository corporation 1276, corresponding to depository 65 of FIG. 1, trading firm 1278, corresponding to firms 55 and 60 of FIG. 1, regulator 1280, corresponding to regulator 30 of FIG. 1, custodian bank 1282, corresponding to custodian bank 40 of FIG. 1, financial industry post-trade data processor 1284, corresponding to financial industry post-trade processor 45 of FIG. 1, investment bank 1286, corresponding to investment bank 25 of FIG. 1, investment manager 1288, corresponding to investment manager 35 of FIG. 1, investment firm 1290, such as a hedge fund, registrar bank 1292, corresponding to registrar bank 20 of FIG. 1, individual 1294, broker-dealer 1296, and Newco 1298, corresponding to Newco 10 of FIG. 1.

These external entities, as appropriate, are instances of inquirer 1270 and error claimant 1265 of FIG. 14. In some cases, an external entity has sufficient volume to justify dedicated private line connections that are coupled to a suitable firewall of CCDM 1200.

Figure 16:
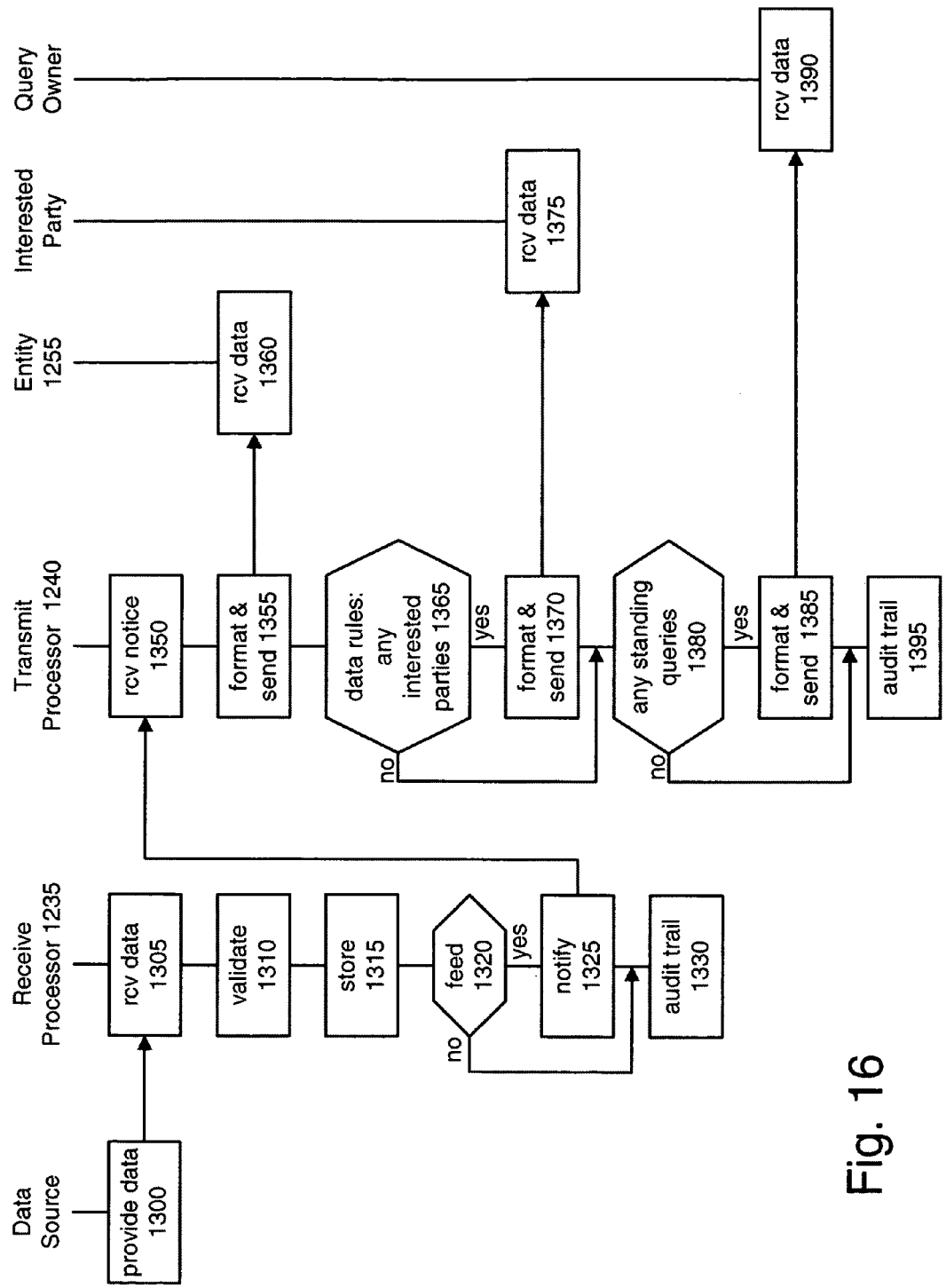
FIG. 16 is a flowchart showing data processing in a first embodiment of CCDM.

FIG. 16 is a flowchart showing how CCDM 1200 creates its data feeds.

At step 1300, a data source, such as data vendor 1262 or trading platform 1264, provides data to CCDM 1200. An instance of data is a securities trade execution report, including identification of the parties to the trade.

At step 1305, receive processor 1235 receives the data.

At step 1310, receive processor 1235 validates the data, that is, checks that its values are within reasonable bounds, and that the source of the data is authorized to submit this type of data to CCDM 1200. When receive processor 1235 is unable to validate the data, it is stored for later exception reporting and analysis (not shown).

Ideally, the data source provides the data in the internal format used by CCDM 1200, that is, with metadata tags. CCDM 1200 publishes an application programming interface (API) to assist data sources in providing data in the desired format. However, some data sources will simply provide data in their own internal format. Generally, CCDM 1200 uses a filter customized for each external data source that receives such data and automatically reformats it. However, the filter is not able to deal with all externally provided data, and when it cannot properly process the data, it writes an exception report for manual handling of the data.

At step 1315, receive processor 1235 stores the data in one of the data stores coupled to high speed data bus 1205.

At step 1320, receive processor 1235 checks whether this data is of a type suitable for one of the data feeds provided by CCDM 1200. For instance, data from a trading platform is usually intended for a data feed provided by CCDM 1200, whereas data from a data vendor relating to, say, a derivative security associated with a data feed security, is not intended for a data feed provided by CCDM 1200, rather, it is intended to be stored and used in responding to one-time queries. If the data is suitable for a CCDM data feed, processing continues at step 1325, otherwise, processing continues at step 1330.

At step 1325, receive processor 1235 sends a notification message to transmit processor 1240 that data is available for transmission.

At step 1330, receive processor 1235 writes an audit trail record corresponding to the event of receiving data.

At step 1350, transmit processor 1240 receives the notification of new data from receive processor 1235.

At step 1355, transmit processor 1240 format the data for one or more data feeds, and sends the data to entities that have subscribed to the data feed. For instance, one data feed may be for trades from a predefined set of trading platforms, another data feed may be for quotes relating to certain securities, and so on.

At step 1360, the entity subscribing to the data feed receives the just transmitted data.

At step 1365, transmit processor 1240 checks its data rules to see if there are any interested parties, and if so, at step 1370, sends the data to them. For example, it is assumed that a company is interested in all data related to itself. One instance of a standing rule is "send data about Newco to Newco", which may be overridden by Newco. Another instance of a data rule is "when an investment firm associated with an investment manager changes its custodian bank, send a notice of the change to the investment manager". A purpose of data rules is to automate a portion of back-office administrative functions.

In some embodiments, a data rule is implemented as a standing query with no expiration date.

At step 1375, the interested party receives the data transmitted to it.

At step 1380, transmit processor 1240 checks whether there are any standing queries. Generally, a standing query is submitted via website server 1238 using a structured interface such as drop-down menus, checking data for reasonable values, and so on. In some cases, standing queries are submitted by administrator 1260. In other cases, analysis processor 1235 generates standing queries according to rules data 1210. If so, at step 1385, transmit processor 1240 formats the new data to be responsive to the standing query and sends it to the query owner.

The standing queries may consist of data arrayed as XML schemas, XML DTD's, SQL queries, Java scripts, and other content and/or computational profiling arrangements, both standard and proprietary.

Figure 18B:
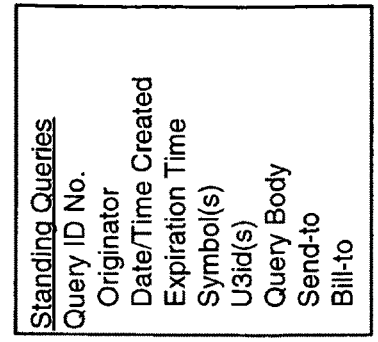
FIGS. 18A-18D are diagrams showing data organization in a CCDM.

FIG. 18B shows some of the information maintained for each standing query at CCDM 1200. Examples of the "Query Body" are as follows:

- all quotes for XYZ common stock
- all trades for XYZ common stock at trading platforms TP100, TP200, TP300
- all corporate actions for NewCo
- hourly, at (:59) minutes after the hour, volume of XYZ common stock at all trading platforms relative to volume of all put options for XYZ common stock at all trading platforms
- all trades for all stocks and bonds of NewCo and its subsidiaries at all trading platforms in US, Canada and EU.

The last two queries are difficult to express in conventionally available systems. In particular, conventional data vendors put the responsibility of identifying corporate subsidiaries on inquirers.

As a new trade report is received, transmit processor computes the result (formats it) and distributes it.

At step 1390, the query owner receives the standing data.

At step 1395, transmit processor writes an audit trail record reflecting its transmission(s) of the new data.

Figure 17:
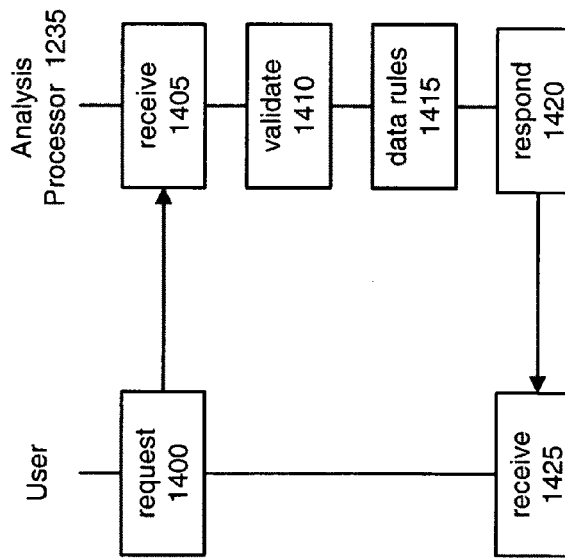
FIG. 17 is a flowchart showing query processing in a CCDM.

FIG. 17 is a flowchart showing query processing in CCDM 1200.

At step 1400, a user sends a query to CCDM 1200. One instance of a query is a request for trades in a security that occurred in a particular time interval. A further instance of a query is a request for a U3id associated with a security. Another instance of a query is a request for error reimbursement.

In some embodiments, queries are created using web pages at a web site provided by web server 1238 drop-down menus, radio button and so on, ensuring that the query is likely to be in proper form. In other embodiments, queries are created using a query language and submitted via an application programming interface from the querying entity's computer. In other embodiments, queries are provided in a natural language format and CCDM 1200 assists in converting natural language format to the internal format used in standing queries database 1225.

At step 1405, analysis processor 1235 receives the query.

At step 1410, analysis processor 1235 validates the query, including whether the query owner is authorized to inquire about this data, and whether the query syntax and content is correct.

At step 1415, analysis processor 1235 applies data rules 1210 to generate a response to the query. In some cases, analysis processor 1235 refers the query to an administrator at CCDM 1200. For instance, decisions on error reimbursement must be manually approved by a CCDM administrator. Many requests for error reimbursement also require manual intervention by a CCDM administrator, to resolve circumstances contributing to the error. Some requests for error reimbursement can be resolved automatically, such as errors due to a computer malfunction by the CCDM, when the computer malfunction was previously known to the CCDM.

At step 1420, analysis processor 1235 sends the response to the query owner.

At step 1425, the user who provided the query receives a response thereto.

At step 1430, analysis processor 1235 writes an audit trail record reflecting the query and its response.

FIGS. 18A-18D are diagrams showing data organization in a CCDM. The data in FIGS. 18A-18D is only a subset of actual data. Importantly, the unique, unambiguous and universal identifier (U3id) generated by CCDM 1200 is included in most records, enabling data to be cross-referenced and properly aggregated.

Figure 18A:
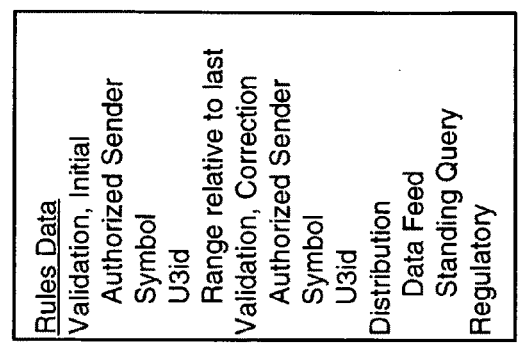

FIG. 18A shows rules data used by the CCDM, such as data rules 1210.

FIG. 18B is discussed above with regard to FIG. 16 step 1380, standing queries.

Figure 18C:
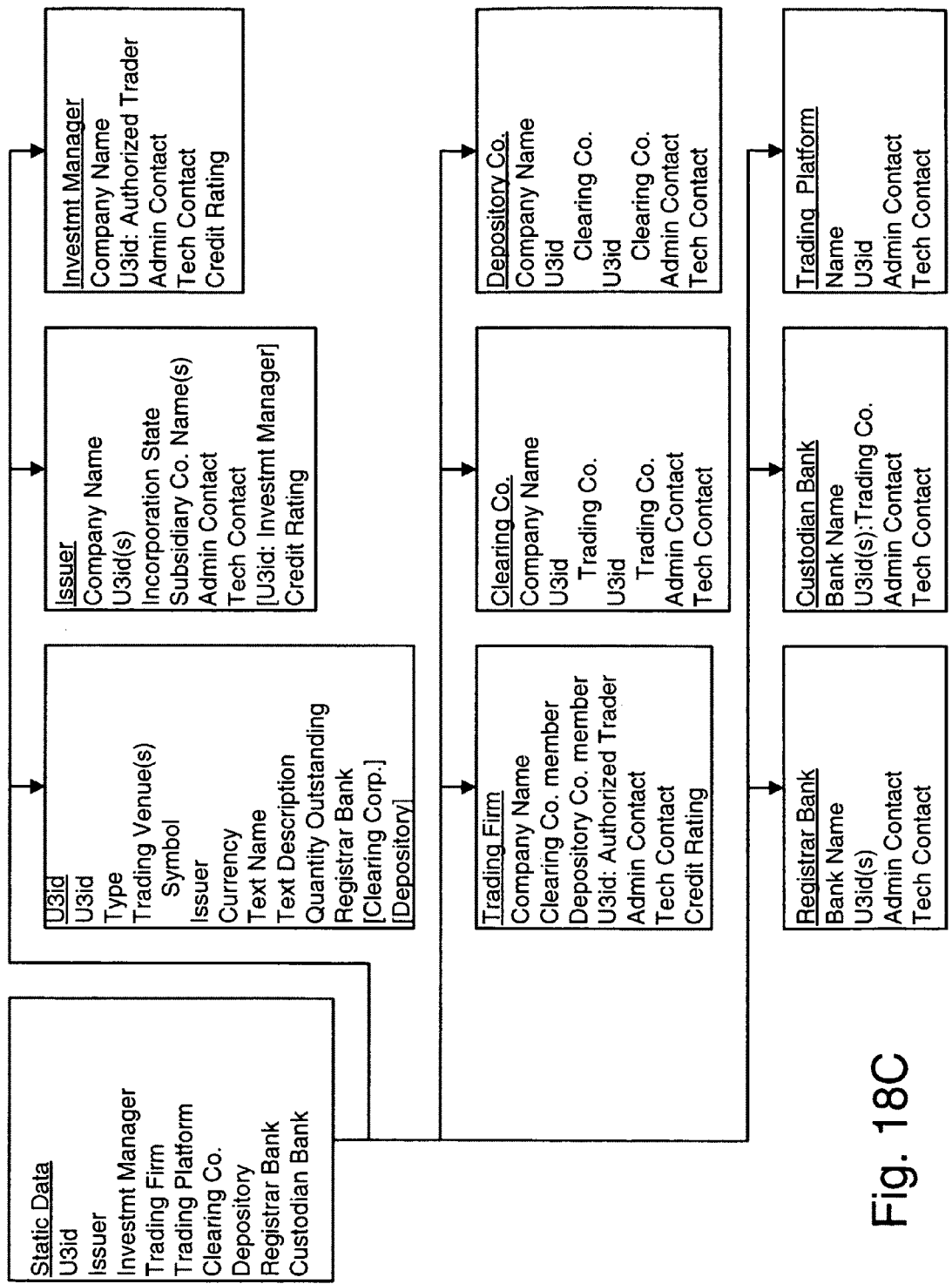

FIG. 18C shows static data used by the CCDM, such as static data 1215.

Figure 18D:
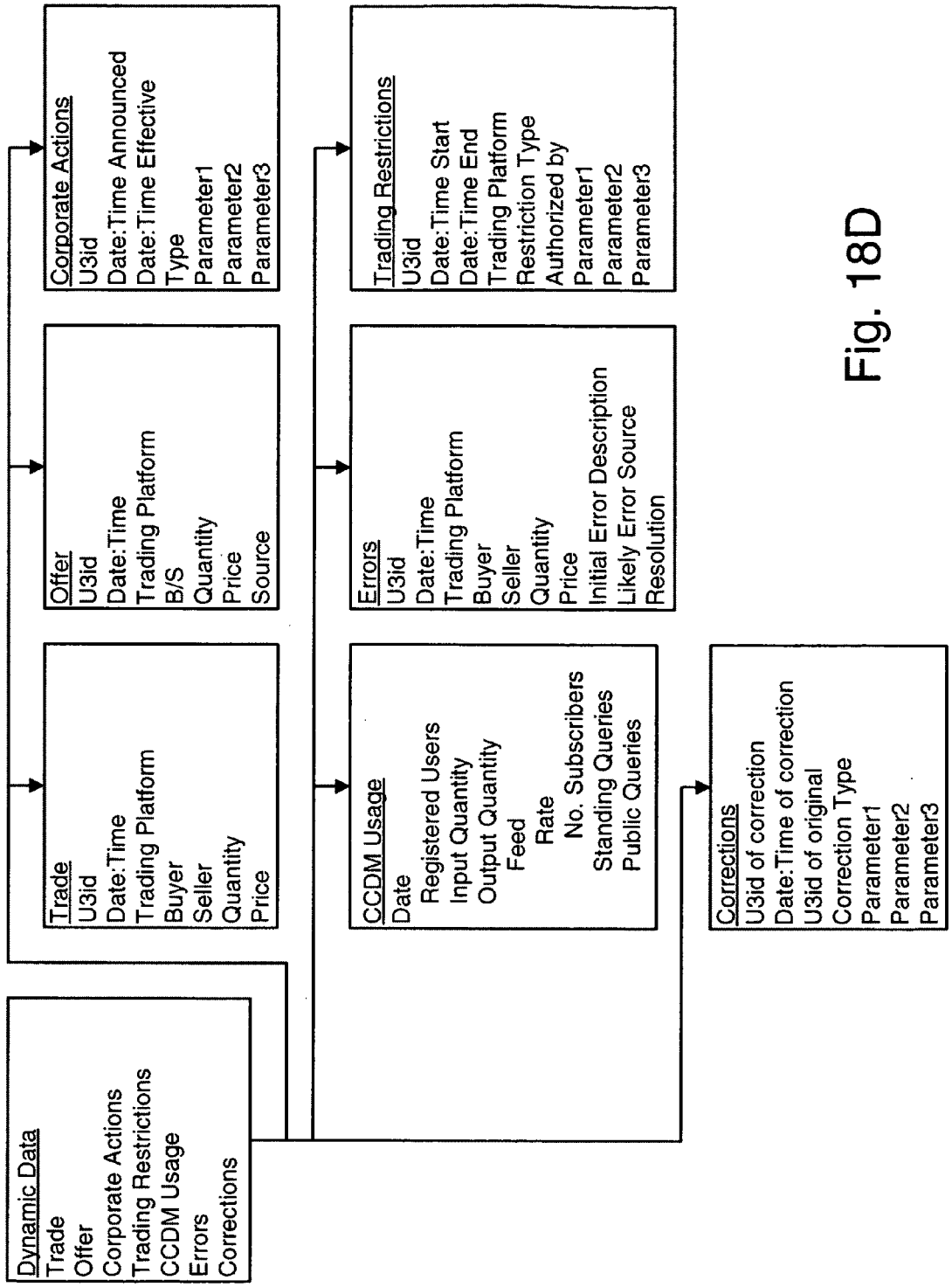

FIG. 18D includes corporate actions. Types of corporate actions include share redemptions, rights offering, reorganization, bankruptcy, proxy conversion, periodic payment, merger, acquisition, rights warrants, dividends and so on. The terms "parameter1", "parameter2", and so on have different meanings depending on the type of corporate action. In some embodiments, the values for the parameters are associated with metadata describing the type of parameter.

FIG. 19 shows a second embodiment of the central counterparty for data management, CCDM 1201.

FIG. 19 is similar to FIG. 15, and for brevity, only differences will be discussed.

In FIG. 19, semantic network 1250 is provided. Standing queries are stored in standing queries database 1252, which may be a single data storage device or an array of data storage device, in semantic network 1250. Query processor 1251 is a single processor or a plurality of coupled processors, resides in semantic network 1250, and serves to compare data received from transmit processor 1241 with the standing queries, and to provide responses to the query owners. Semantic network 1250 is capable of content routing. Content-based routing is explained in U.S. Patent Publication No. 2002/0150093 (Ott), the disclosure of which is hereby incorporated by reference in its entirety.

CCDM 1201 uses an interactive network software application supported by specialized scalable content routers (query processor 1251) with embedded XML (or other) schemas representing all potential reference data content requests of all assembled financial transactions. Query processor 1251, deployed within semantic network 1250 overlaid on communication network 1266, includes an algorithm that allows for content selection, content routing and load balancing. The router software allows for the network to select the path that a message will follow to its destination through setting of user controlled profiles within the router which interrogating the content of an XML or other schema defined message. The user need only send his/her profile, in this case in the form of a request for a specific reference data set to the nearest router. The routers talk to each other and exchanges aggregated profiles. A message/packet is distributed through the network because each router knows the interest of its neighbor routers and they know their neighbors' profile. The software dynamically adjusts the filtering between any two contiguous nodes in the network thus allowing for dynamic load balancing and scaling. Packets may travel through multiple routers and each router makes a decision on what to do with it. The routers operate within a multicast network. A message will be delivered to multiple users if it matches multiple profiles.

The matching of user defined profiles to the message content is done by the algorithm which operates on the entire schema for the message resident in the specialized router software. It matches an "interest profile" (standing query), that is a subset of the schema, as represented by a user controlling the selection as specified in the same schema as the message. The message that passes the query will be forwarded, otherwise not.

A forwarded message represents a validated string of reference data and this invention will calculate a unique encrypted tag number (in one such embodiment Tag No.=Modulus 10/11 calculation+random number), combining the bit values of reference data content with a random number, and place the resulting number in a tagged field. It will then be logged and carried along with the transaction for audit purposes in validating a warranty request on any failed transactions. Also note, that the network is schema agnostic. If end users agree on a new schema, it can be implemented immediately; nothing needs to be changed inside the network.

The router software separates a message into a header and an optional "payload". If the message is unstructured, the header contains a content descriptor; if the message is, for example, a structured XML message it can go fully into the header. The distinction between header and payload simply defines what the router uses for its routing decision.

The benefit of this solution is that the heavy lifting of selection of data is done in the network where large bandwidth abounds vs. maintaining user profiles at a centralized server as in FIG. 15. Also by raising the abstraction level of what a network can do, the cost of building and maintaining applications are greatly reduced. Previously a network could only deliver to a specific terminal address. If required to build a data centric solution, multiple layers of middle-ware are required on top of the network. This solution allows data abstraction within the network and routing directly to the application.

Secondly, in an overnight or periodic updating mode, such information as closing (valuation) prices (for example every financial instrument master record is updated) gets stored at the central store of all reference data (the CCDM Data Pool) as well as in the downstream distributed data stores specific to each organization.

Finally, the central store of reference data at the CCDM Data Pool is both dynamically and periodically being updated by various suppliers and creators of the basic information of reference data. For example, a notification is received that on a certain date, Hewlett Packard will acquire Compaq, or that as of a specific date the holders of stock in Company X will now have twice the number of shares due to a 100% stock dividend, or that one dealer went out of business, or that a new futures exchange is starting up, or a new company is assigned a trading symbol and ID number, or that an exchange will be closed on a certain date, etc. Further, internally contained reference data triggers events such as in a financial instruments master record containing information as to a conversion date and conversion rate for a bond, the next reset date for a swap, or the approaching ex-date for a stock dividend. All such changes will be broadcast to also find its way downstream to the distributed data stores. Over time, the separate downstream stores of reference data will be eliminated as more business application are written or modified to access the central store of reference data (the CCDM Data Pool) and the central store of information will be distributed across the network.

Figure 20:
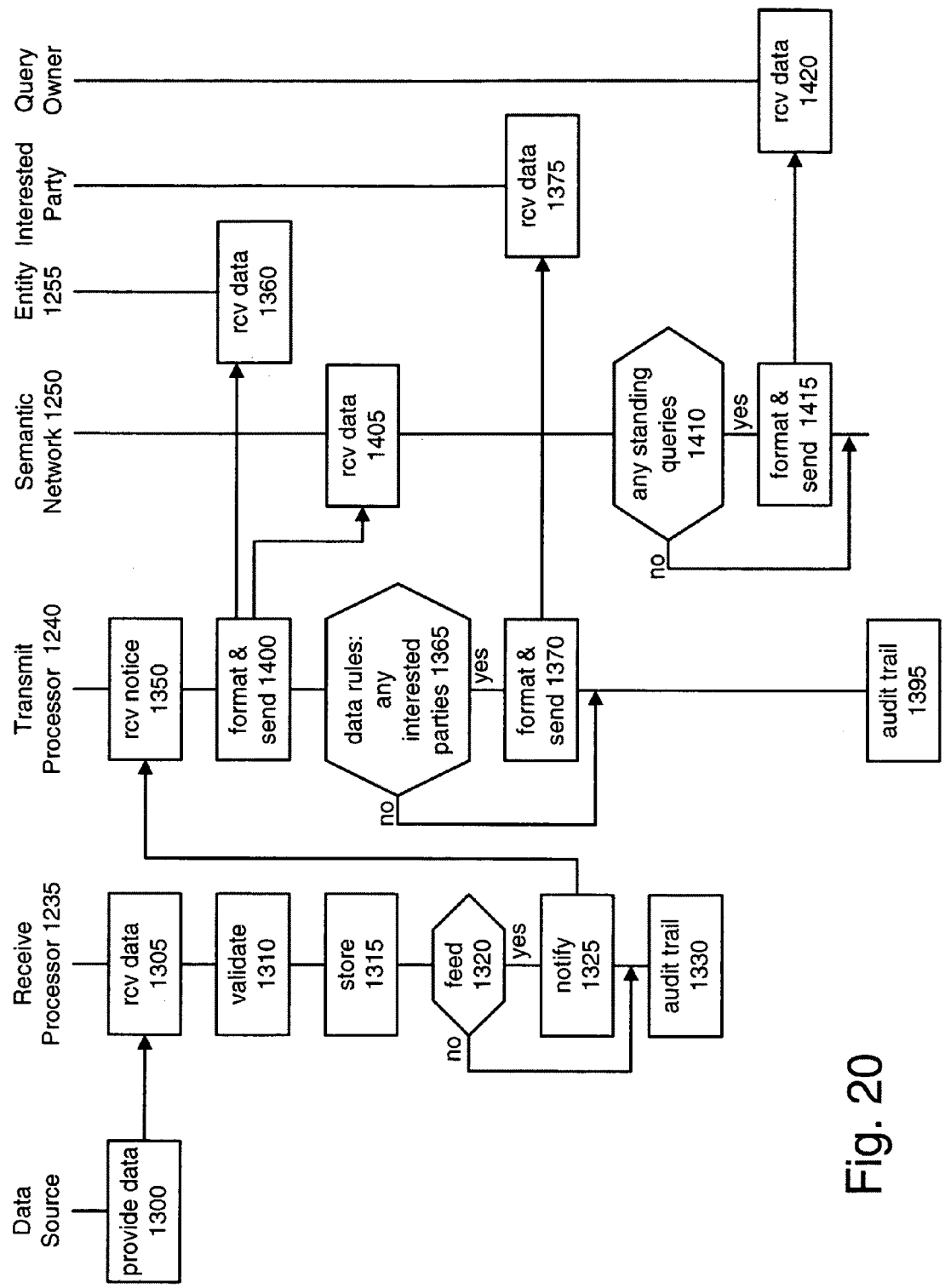
FIG. 20 is a flowchart showing data processing in the embodiment of FIG. 19.

FIG. 20 is a flowchart showing data processing in the embodiment of FIG. 19.

FIG. 20 is similar to FIG. 16, and for brevity, only differences will be discussed.

At step 1400, transmit processor 1240 of CCDM 1201 sends its data feed to semantic network 1250, in addition to entity 1255.

At step 1405, semantic network 1255 receives the data.

At step 1410, semantic network 1250 checks whether there are any standing queries relevant to the data. If so, at step 1415, semantic network 1250 generates a response and sends it to the query owner.

At step 1420, the query owner receives the response from semantic network 1250.

Note that transmit processor does not perform steps 1380-1385, shown in FIG. 16.

Figure 21:
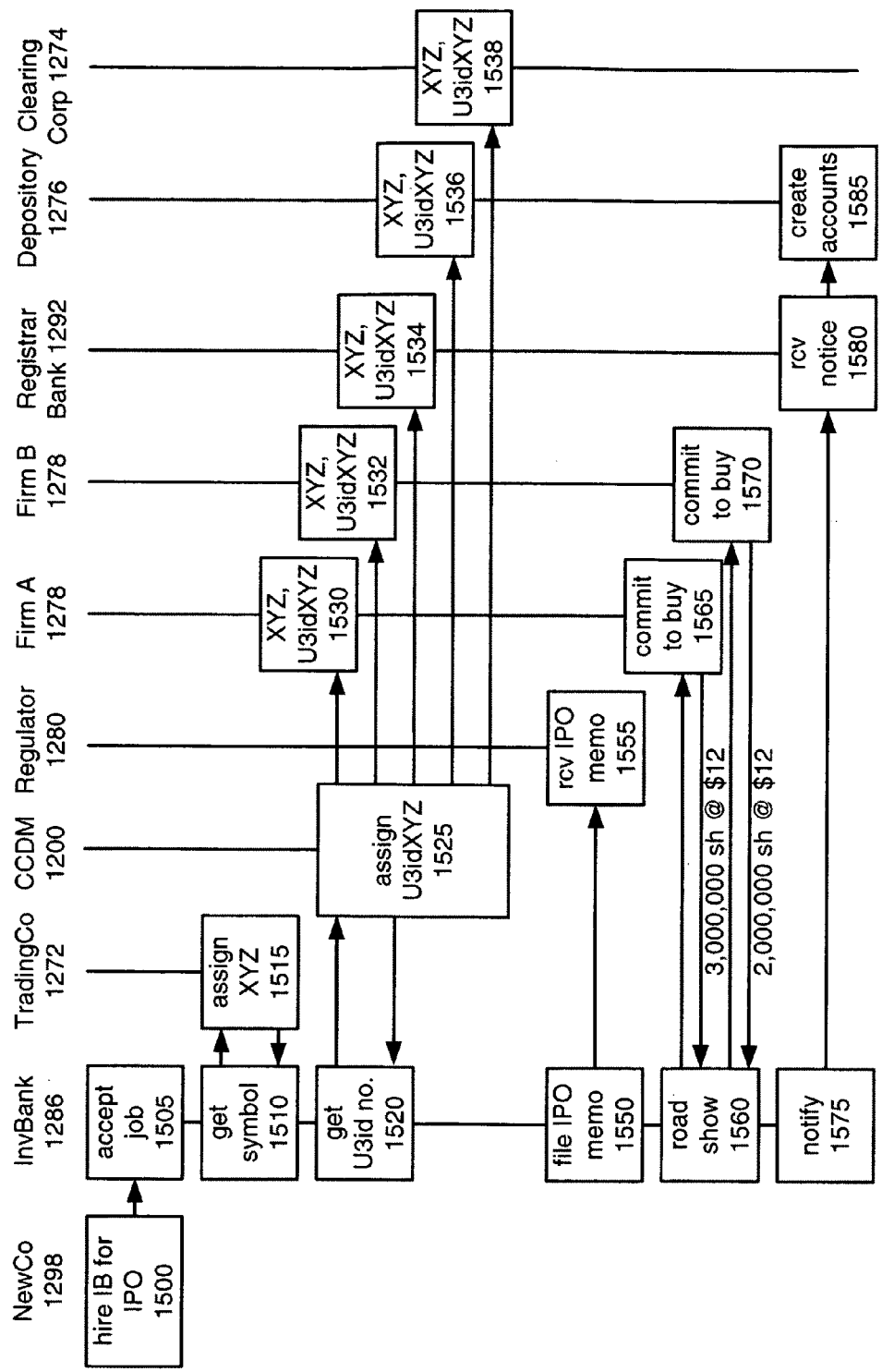
FIG. 21 is a flowchart showing pre-trading activity with a CCDM.

FIG. 21 is a flowchart showing pre-trading activity with CCDM 1200.

A prospectus, offering memorandum, financial event announcement, incorporation or business organizational documents, ISDA master agreement, and other such paper document is conceived and developed at the origins of a business formation, financial transaction and/or financial event. It is embodied in a digital document, compatible with standard computer machine processed formats. It is subsequently transformed by standard mapping software into an extensible markup language (XML) format. This format, in the some embodiments is XBRL. Using a predesigned XBRL taxonomy the data elements are transformed through mapping software from human readable (word processed) data into machine readable content at an elemental level. The data in transformed XBRL format is tagged with meaningful data names and with the first instance of the tag i.e."<BusinessEntityID>", "<FinancialEventID>" "<FinancialInstrumentID>", etc, and then again the second instance of the identical tag, such tag being unique, unambiguous, consistent and universal. The actual Business Entity Identifier, Financial Event Identifier and Financial Instrument Identifier is a number of variable length assigned by the business entity or its designated agent after applying for such identity through a global registry, which is the designated assigner of such identities. Such number, also unique, unambiguous, consistent and universal is placed within the first and second instance of the tag.

The tagged data is transmitted via communication lines to the central storage device of the CCDM 1200 where it is filed in a computer storage medium with other information similarly sourced and communicated. The identity keys are linked to unique, unambiguous and universal descriptions in human readable language for describing the instrument, business entity, and financial event in standardized abbreviated form. It is further linked to a symbol. In similar manner information about supply chain participants, legal business hierarchies of the business entity, and their role in the supply chain is further described in unique, unambiguous and universal manner through other coding conventions that is part of this invention. The identification numbers are used as the storage key by the computer storage device for later retrieval by other component systems and methods of this invention.

Additional information will be maintained in a computer storage device of CCDM 1200 Data Pool connected by a communication device to the CCDM's Registry linked by identity keys and/or symbol. Such information as the full, official description of the financial instrument, its terms and conditions, its trading venue(s) and/or listing markets, it's currencies of trade, its place and currency of settlement and other such data attributes of the financial instrument will be stored as reference data in CCDM 1200 Data Pool. Similar fuller information about business entities and their legal hierarchies, and financial events and their relationship to financial instruments and business entities are also stored in CCDM 1200 Data Pool. Other data pools are maintained by commercial redistributors of reference data and linked to CCDM 1200 Registry in CCDM 1200 Data Pool to synchronize their identifiers so they can maintain all manner of supplemental data, including to be made available to all others who have synchronized their data identifiers to the CCDM 1200 Registry.

The conventional situations discussed above will now be revisited with CCDM 1200 in use.

FIG. 21 is similar to FIG. 2, and for brevity, only differences will be discussed.

At step 1520, investment banker 1286 requests a U3id for a new securities issue, providing the symbol for the new security obtained from trading platform 1272, and the security name, to CCDM 1200.

At step 1525, CCDM 1200 provides the new U3id. Also, CCDM 1200 distributes the new U3id to all parties who have indicated interest in being informed of new U3ids, namely, Firm A, Firm B, Registrar Bank 1292, depository 1276 and clearing corporation 1274. Other parties can query CCDM 1200 to obtain the new U3id, once they are aware of the symbol.

At step 1530, Firm A receives the U3id, symbol and security name.

At step 1532, Firm B receives the U3id, symbol and security name.

At step 1534, registrar bank 1292 receives the U3id, symbol and security name.

At step 1536, depository 1276 receives the U3id, symbol and security name.

At step 1538, clearing corporation 1274 receives the U3id, symbol and security name.

Having CCDM 1200 be the source of U3id, and able to provide it in a variety of ways to a variety of data consumers, eliminates prior art errors due to manual entry, confusion with other securities, and so on.

It will be recalled that FIG. 5 illustrates an error in which clearing corporation 70 has stored the wrong company name for the identifier. The error illustrated in FIG. 5 is highly unlikely to occur when CCDM 1200 is in use, because CCDM 1200 is the sole source of U3id identifiers, and distributes the U3id with the proper company name. Clearing corporation 1274 receives this information automatically, as shown at FIG. 21 step 1538, and so is highly unlikely to err in associating the company name with its U3id.

It will be recalled that FIG. 6 illustrates an error in which clearing corporation 70 has mistakenly determined that the ex-dividend date for XYZ is T+4, whereas the correct dividend date is T+3. When using CCDM 1200, this error is avoided, because the announcement of the dividend date is distributed on a data feed from CCDM 1200 along with computer readable metadata identifying the correct ex-dividend date, as shown in FIG. 16 step 1360, avoiding the manual errors that occur when a clerk tries to convert the conventional notice shown in Table 1 to digital form.

It will be recalled that FIG. 9 illustrates an error in which investment manager 35 has the wrong custodian bank associated with mutual funds AA, BB and CC.

At a minimum, when using CCDM 1200, investment manager 1288 can quickly query CCDM 1200 for the correct custodian bank and send revised notices, without having to call its client.

In an improved scenario, investment manager 1288, as an interested party, automatically receives a notice of a change in custodian bank, as shown in FIG. 16 step 1375. Since CCDM 1200 provides notifications in a uniform manner, it is more likely than investment manager 1288, even if a small entity, will be configured to properly receive and apply such notices.

In a further improved scenario, third parties make software available to investment manager 1288 that automatically records and applies the notices from CCDM 1200, so that investment manager 1288 always sends its allocate message to the current custodian bank, entirely eliminating the error shown in FIG. 9. In the conventional situation, each client of investment manager 1288 can have its own data formats, so it is difficult to automate reception of routine messages. In contrast, using CCDM 1200 as an industry wide utility makes it cost-effective for software providers to offer programs that automatically support investment manager 1288.

Figure 22:
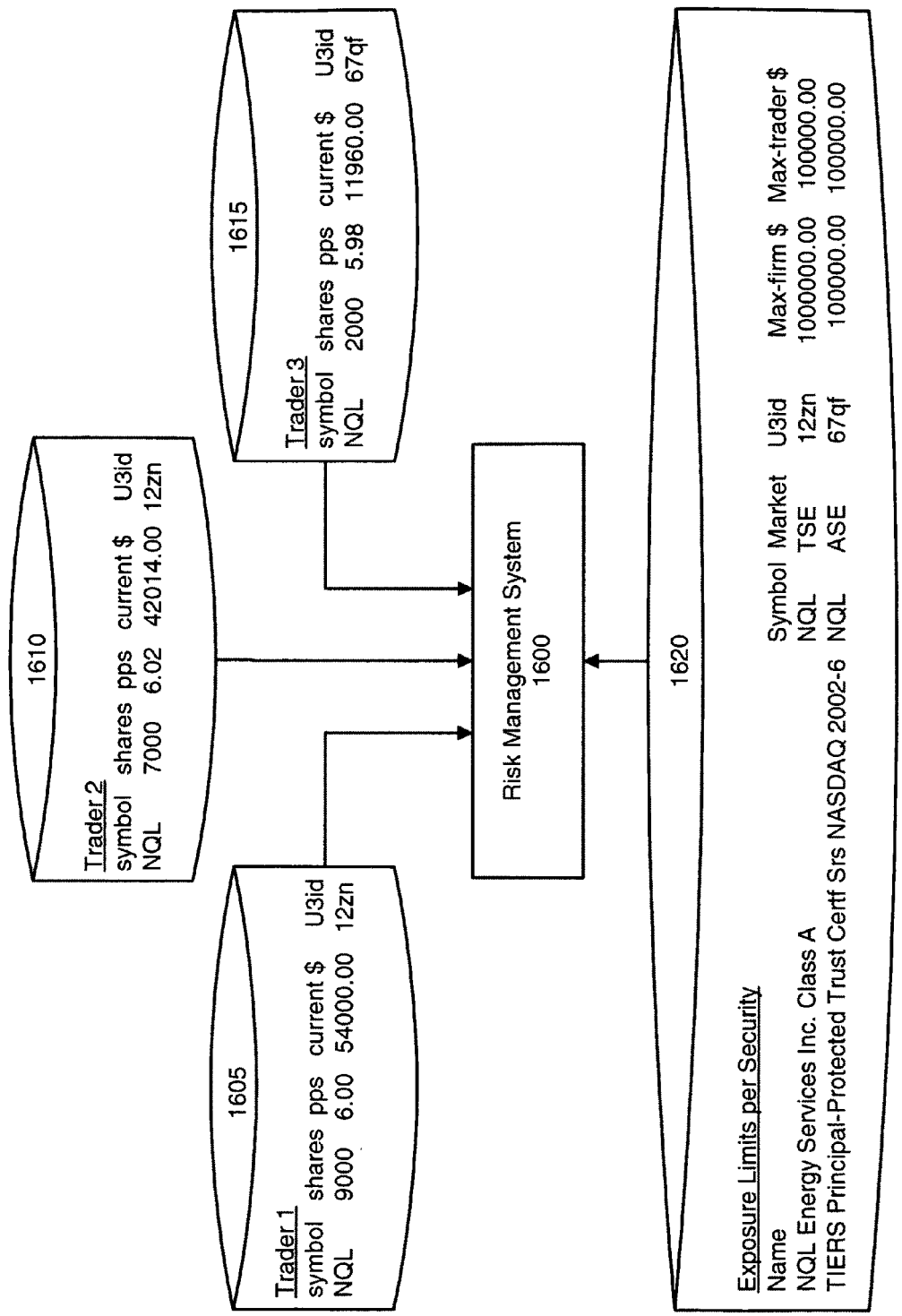
FIG. 22 is a flowchart showing intra-firm data aggregation.

FIG. 22 is a flowchart showing intra-firm data aggregation when CCDM 1200 serves as a pre-trade data source. FIG. 22 corresponds to FIG. 10, and for brevity, only differences will be discussed. In particular, note that in FIG. 22, each record has an additional field for the U3id, which enables risk management system 1600 to properly distinguish which exposure limit applies to each trade for the symbol NQL. Accordingly, risk management system 1600 can properly carry out the intent of its creators, avoiding the prior art error where the firm was unknowingly overexposed, despite each trader being within its per-trader exposure limit.

Figure 23:
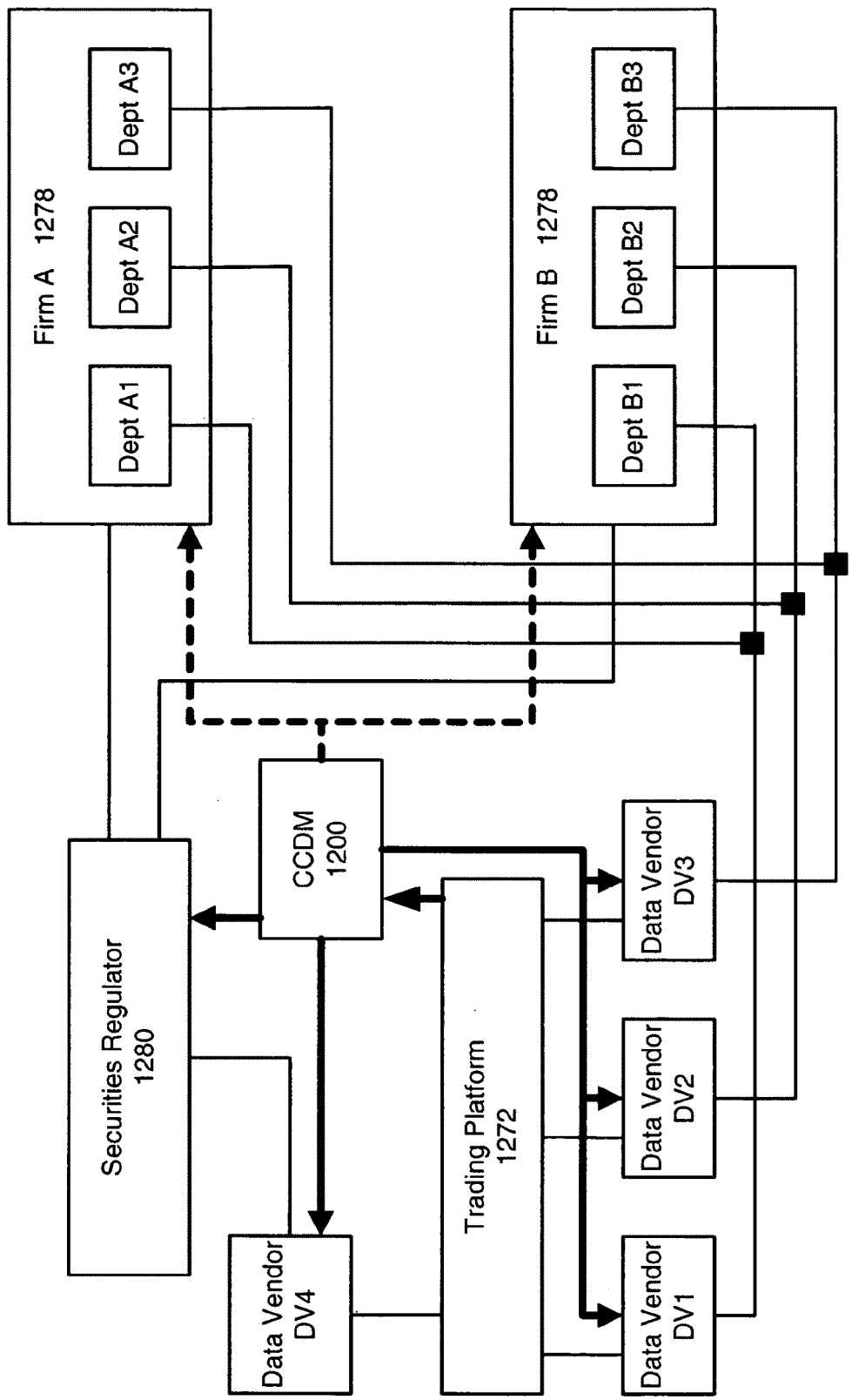
FIG. 23 is a block diagram showing another logical configuration with a CCDM.

FIG. 23 is a block diagram showing another logical configuration with CCDM 1200. FIG. 23 corresponds to FIG. 11, and for brevity, only differences will be discussed. As shown by the bold lines in FIG. 23, trading platform 1272 supplies its data to CCDM 1200. CCDM 1200 reformats the data from trading platform as needed, and supplies the reformatted data from trading platform 1272 to each of the four data vendors. The data vendors then add their custom analytics and supply data feeds to different departments of Firms A and B, and to securities regulator 1280. As shown by the dotted lines in FIG. 23, Firms A and B may also get trade data directly from CCDM 1200.

It will be recalled that FIG. 12 illustrates a prior art inter-firm data aggregation problem caused by data vendors supplying respectively different closing prices for the same security. This problem is eliminated through use of CCDM 1200. Thus, the data from the various firms are commensurate, enabling securities regulator 1280 to do a better job, as she has a more accurate picture of what is happening.

CCDM 1200 is useful for eliminating or attenuating other data errors that occur in the financial industry, in addition to the errors discussed above.

Determining the correct amount of reserve capital for CCDM 1200 will now be discussed.

CCDM 1200 guarantees to its users that their trades will not fail to match due to problems with data from CCDM 1200. More specifically, if an error does occur based on properly using data from CCDM 1200, CCDM 1200 reimburses the customer for the costs associated with the error. The costs include covering the mismatched trade, or the difference between the actual sale price and the correct sale price.

Matching errors are not expected, just errors that are created through errors, omissions, breaches of security, computer failure, clerical faults, etc. within the CCDM and externally through weather and catastrophic events such as hurricanes, floods, fires, etc. The data errors that occur conventionally, i.e., errors due to improper reference data, failed transactions because a proprietary identifier was created for a security, a valuation was wrong because a closing price was not recorded properly, are eliminated or mitigated by CCDM 1200. However, should errors occur the CCDM must be prepared to support the losses and thus must set aside capital for such improbable eventualities (unexpected losses). A client notifies CCDM 1200 that a transaction failed to be aggregated or matched and that the identifiers used came from CCDM 1200. These identifiers had to have been previously certified as U3 compliant for the CCDM to be involved. An investigation tracks back through audit data 1212.

As a risk mitigating infrastructure utility, CCDM 1200 adheres to international norms of capital for unexpected losses not covered by reserves, insurance, etc. CCDM 1200 determines the capital reserve for losses, also referred to as operational risk capital, using the Advanced Measurement Approach (AMA). CCDM 1200 is not the normal financial institution that the AMA is prescribed for.

Under the basic approach to modeling operational risk, really a collection of many different stochastic techniques, referred to as the loss distribution approach (LDA), banks estimate, for each business line/risk type cell, or group thereof, the likely distribution of operational risk losses over some future horizon (bank regulators require a one year period). The Value-at-Risk (VaR) and resulting capital charge from these calculations is based on a high percentile of the loss distribution (bank regulators require a 99.9% confidence level). This overall loss distribution is typically generated based on assumptions about the likely frequency and severity of operational risk loss events. In particular, LDA's usually involve estimating the shape of the distributions of both the number of loss events and the severity of individual events. These estimates may involve imposing specific distributional assumptions (i.e., a Poisson distribution for the number of loss events and a log normal distribution for the severity of individual events) or deriving the distributions empirically through techniques such as boot-strapping and Monte Carlo simulation.

An overall capital charge may be based on the simple sum of the operational risk VaR for each business line/risk type combination which implicitly assumes perfect correlation of losses across these cells or by using other aggregation methods that recognize the risk-reducing impact of less-than-full correlation.

Presently, for operational risk there are several LDA methods being developed and no industry standard has yet emerged. Generally, an LDA model is a quantitative methodology for assigning dollar values to expected and unexpected losses.

The output of a typical LDA model consists of (1) The Expected Loss (EL), which is the average loss as calculated from the (cumulative) loss distribution, and (2) The Value at Risk (VaR), which summarizes the worst loss over a target horizon (one year) within a given confidence interval, e.g., 99.9 percent. The statistical accuracy of the VaR number depends on the number of data points and/or simulations. The more simulations or data points (loss history), the more accurate the result will be.

FIG. 24 is diagram of a screen display for claiming error reimbursement.

The error claimant goes to the website provided by website server 1238, signs in to their account using a password and possibly another identifier, such as a biometric or token, then selects "File a Claim for Error Reimbursement" from a menu of things that the claimant is authorized to do.

CCDM 1200 presents the claimant with a screen display for supplying information about their claim. The screen display asks for the U3id associated with the transaction. CCDM 1200 checks whether the claimant has a relationship to this transaction. If the claimant, or the claimant's employer, is not associated with the transaction, then CCDM 1200 will not proceed, so that the claimant will have to call customer service.

If the claimant is authorized to file a claim for this transaction, CCDM 1200 presents the claimant with the known transaction details. CCDM 1200 then provides a drop-down menu so that the claimant can identify the error. The screen display also has fields so that the claimant can explain how the error was noticed, their judgment as to the reason for the error, the amount of the claim, and how the amount was determined.

In some cases, CCDM 1200 knows of a situation that would result in the error, and can automatically confirm that this transaction was affected by the situation, and calculate the expected claim. If the requested claim is less than or equal to the expected claim, CCDM 1200 automatically suggests to an administrator that the reimbursement request be approved.

In other cases, CCDM 1200 is unable to automatically process the request, and provides it to an administrator for manual resolution. The administrator uses audit data 1212, static data 1215 and dynamic data 1220 to research the transaction, and may telephone or email the claimant for more information.

When the reimbursement request is approved, the error is added to loss history data 1214, and CCDM 1200 automatically provides funds to the account of the claimant, either directly or via transferring from the capital account for CCDM 1200 maintained at clearing corporation 1274.

Figure 25:
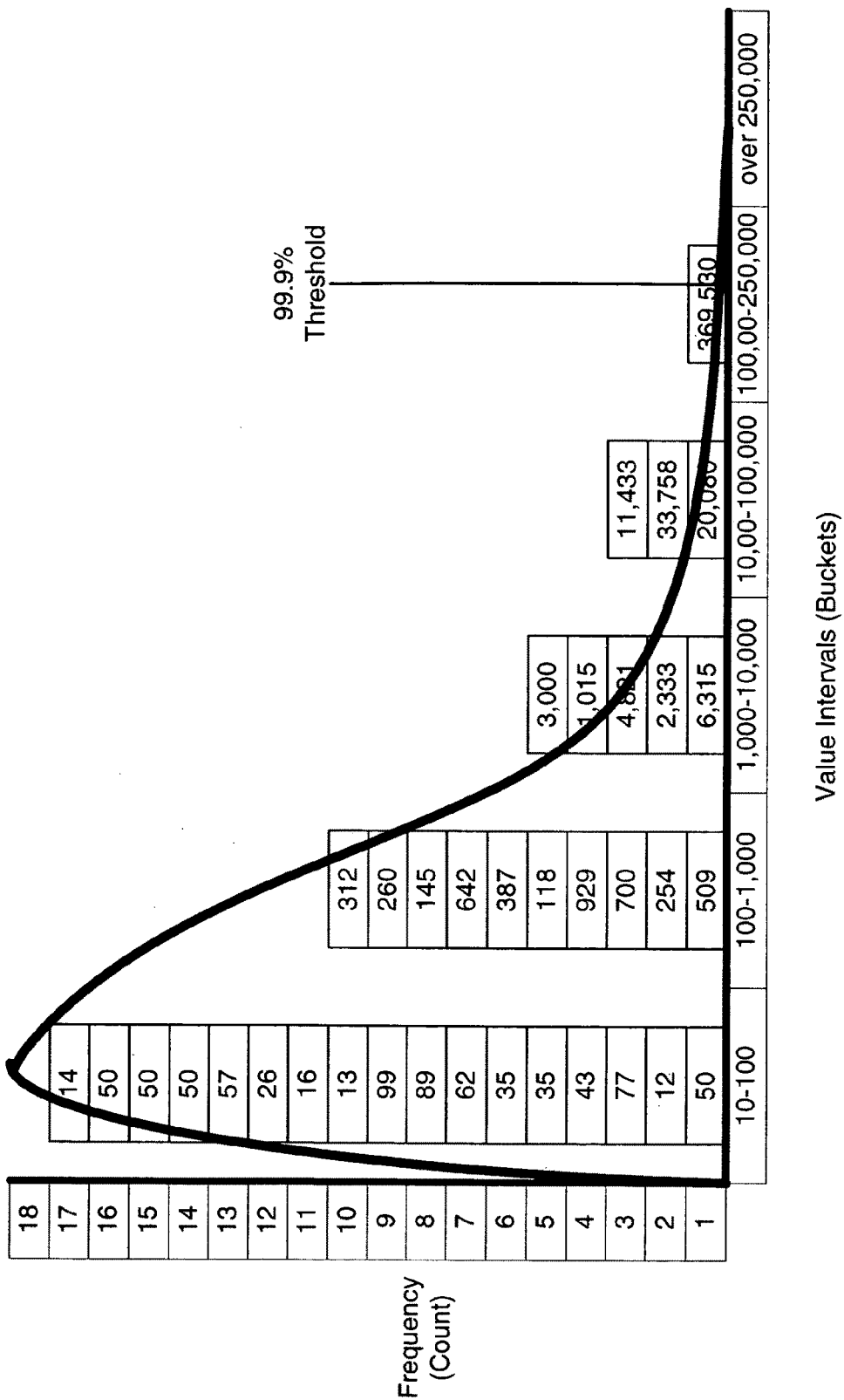
FIG. 25 is a graph referred to in explaining a risk management technique.

FIG. 25 is a graph referred to in explaining a risk management technique.

At a predetermined interval, generally determined by regulatory reporting requirements, such as monthly, CCDM 1200 executes a program for determining the proper amount of funds for its capital account. The program operates as follows.

1. Sort the reimbursed losses, by amount, into one of a predetermined number of loss amount intervals, also referred to as buckets.
2. The reimbursed loss increases by one the number of entries in the bucket. The amount of the loss increases the cumulative amount in the bucket.

3. Obtain manually provided loss information from the Risk Management Department for CCDM 1200, and process as in steps 1 and 2.
4. When all transactions are complete, prepare a histogram.
5. Arrange the buckets so that the largest number of occurrences, usually the smallest number of loss values, is placed at the leftmost side of the histogram, then proceed along the x-axis until the bucket with the smallest number of occurrences is placed at the rightmost side of the histogram. The result is shown in FIG. 25.
6. Fit a Gaussian curve to the histogram. FIG. 25 shows a fitted curve in a heavy line.
7. At a predetermined point on the fitted curve, typically the point that defines where 99.9% of the area of the curve is included, determine the cumulative value of the losses.
8. Subtract the amount in the capital account from the amount determined at step 6, the result is additional required risk capital.

At step 3, the manually provided loss information is obtained from data bases available commercially or by consortium membership in such data bases, one example being the ORX consortium. These data bases contain public and privately reported losses that are part of the requirement under bank regulation for valuing a single firm's capital, not only from its own loss history but from the history of losses from the industry at large.

Along with reserves for expected losses, and the cost of insurance for such items as errors and omissions, fires and thefts, wind and flood damage, computer and utilities failure, terrorist and privacy breaches, and other catastrophic events the economic capital of the CCDM will be calculated for covering 99.9% of the overall losses, Expected (EL) and Unexpected (UL).

The initial assumption about the CCDMs Capital at Risk calculation will be based exclusively on assessing capital for Operational Risk. This initial assessment, recognizing no loss history is yet available, will be computed at an industry accepted standard of 12% of equivalent Financial Market Utility overall capital, such utilities having credit and market risk in addition to operational risk, the singular risk that the CCDM incurs. Thus for a $2 billion capital requirement overall for an equivalent operation incurring all three risk categories, the single operational risk capital for the CCDM initially is to be computed at $240 million.

FIG. 25 shows, on its abscissa (x-axis), six buckets. The bucket value and number of losses in each bucket is shown in Table 3.

TABLE 3

| Bucket value | Number of items |
| --- | --- |
| $10,000-100,000 | 17 |
| $100,000-1,000,000 | 10 |
| $1,000,000-10,000,000 | 5 |
| $10,000,000-100,000,000 | 3 |
| $100,000,000-250,000,000 | 1 |
| over $250,000,000 | 0 |

In some embodiments, at step 7, use the total area under the curve divided by the total area of the curve, and then multiple the resulting fraction by the total value of losses accumulated as displayed and summed from the histograms.

In other embodiments, other techniques are used, as described in U.S. patent application Ser. No. 12/081,619, filed Apr. 18, 2008, having a common inventor herewith, the disclosure of which is hereby incorporated by reference.

Although illustrative embodiments of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for processing a financial transaction, comprising:
   providing, by a computer at a central source operating according to a computer program, reference data for the financial transaction, the reference data identifying a security and a market where the security is traded, the reference data being provided to a first firm for storage in a first data repository and then for creating a first order for transmission to the market,
   providing, by the computer at the central source operating according to the computer program, the reference data for the financial transaction to a second firm for storage in a second data repository and then for creating a second order for transmission to the market, the first firm being different from the second firm, the first data repository being different from the second data repository,
   receiving, by the central source computer, an execution notice from the market that created an executed trade based on the first order and the second order, each of the first order and the second order created from the reference data received from the central source,
   generating, by the central source computer, a first unique tag based on the execution notice,
   associating, by the central source computer, the first unique tag with the execution notice to create a validated execution,
   storing the validated execution at the central source computer, and
   sending, by the central source computer, the validated execution to the first firm and the second firm,
   wherein the central source, the market, the first firm and the second firm are different entities.

2. The method of claim 1, further comprising receiving, by the central source computer, a settlement submission from the first firm based on the validated execution,
   comparing, by the central source computer, the settlement submission with the stored validated execution,
   generating, by the central source computer, a second unique tag based on the settlement submission,
   associating, by the central source computer, the second unique tag with the settlement submission to create a validated settlement submission,
   storing the validated settlement submission at the central source computer, and
   sending, by the central source computer, the validated settlement submission to the first firm and a settlement facility.

3. The method of claim 1, further comprising
   receiving, by the central source computer, new reference data from a data-providing entity,
   determining, by the central source computer, that the new reference data is acceptable when the new reference data meets an acceptance threshold, to generate accepted reference data, and
   storing the accepted reference data at the central source.

4. The method of claim 3, further comprising
associating, by the central source computer, syntax data with the accepted reference data, to generate structured reference data, and
storing the structured reference data at the central source computer.

5. The method of claim 3, further comprising sending, by the central source computer, the accepted reference data to the first firm for storage at the first firm.

6. The method of claim 3, further comprising
receiving, by the central source computer, a profile from the first firm,
storing, by the central source computer, the profile in a router that is part of the central source computer,
providing, by the central source computer, the accepted reference data to the router,
comparing, by the router, the stored profile to the accepted reference data to determine whether the accepted reference data should be sent to the first firm, and
sending, by the router, the accepted reference data to the first firm when the router determines is that the accepted reference data should be sent to the first firm.

7. The method of claim 1, further comprising
determining, by the central source computer, that a trigger event has occurred,
generating, by the central source computer, triggered reference data, and
storing the triggered reference data at the central source computer.

8. The method of claim 7, further comprising sending, by the central source computer, the triggered reference data to the first firm for storage at the first firm.

9. The method of claim 8, further comprising
receiving, by the central source computer, a profile from the first firm,
storing, by the central source computer, the profile in a router that is part of the central source computer,
providing, by the central source computer, the triggered reference data to the router,
comparing, by the router, the stored profile to the accepted reference data to determine whether the triggered reference data should be sent to the first firm, and
sending, by the router, the triggered reference data to the first firm when the router determines that the triggered reference data should be sent to the first firm.

10. The method of claim 8, further comprising indemnifying, by the central source computer, the first firm from a loss due to faulty reference data.

11. A method for processing a financial transaction, comprising:
providing, by a computer at a central source operating according to a computer program, reference data for the financial transaction, the reference data identifying a security and a market where the security is traded, the reference data being provided to a first department in a first firm for storage in a first data repository and then for creating a first order for transmission to the market,
providing, by the computer at the central source operating according to the computer program, the reference data for the financial transaction to a second department in the first firm for storage in a second data repository and then for creating a second order for transmission to the market, the first data repository being different from the second data repository,
receiving, by the central source computer, an execution notice from the market that-created an executed trade based on the first order and the second order, each of the first order and the second order created from the reference data received from the central source,
generating, by the central source computer, a first unique tag based on the execution notice,
associating, by the central source computer, the first unique tag with the execution notice to create a validated execution,
storing the validated execution at the central source computer, and
sending, by the central source computer, the validated execution to the first firm,
wherein the central source, the market and the first firm are different entities.

12. The method of claim 11, further comprising
receiving, by the central source computer, a settlement submission from the first firm based on the validated execution,
comparing, by the central source computer, the settlement submission with the stored validated execution,
generating, by the central source computer, a second unique tag based on the settlement submission,
associating, by the central source computer, the second unique tag with the settlement submission to create a validated settlement submission,
storing the validated settlement submission at the central source computer, and
sending, by the central source computer, the validated settlement submission to the first firm and a settlement facility.

13. The method of claim 11, further comprising
receiving, by the central source computer, new reference data from a data-providing entity,
determining, by the central source computer, that the new reference data is acceptable when the new reference data meets an acceptance threshold, to generate accepted reference data, and
storing the accepted reference data at the central source.

14. The method of claim 13, further comprising
associating, by the central source computer, syntax data with the accepted reference data, to generate structured reference data, and
storing the structured reference data at the central source computer.

15. The method of claim 13, further comprising sending, by the central source computer, the accepted reference data to the first firm for storage at the first firm.

16. The method of claim 13, further comprising
receiving, by the central source computer, a profile from the first firm,
storing, by the central source computer, the profile in a router that is part of the central source computer,
providing, by the central source computer, the accepted reference data to the router,
comparing, by the router, the stored profile to the accepted reference data to determine whether the accepted reference data should be sent to the first firm, and
sending, by the router, the accepted reference data to the first firm when the router determines that the accepted reference data should be sent to the first firm.

17. The method of claim 11, further comprising
determining, by the central source computer, that a trigger event has occurred,
generating, by the central source computer, triggered reference data, and
storing the triggered reference data at the central source computer.

18. The method of claim 17, further comprising sending, by the central source computer, the triggered reference data to the first firm for storage at the first firm.

19. The method of claim 18, further comprising
receiving, by the central source computer, a profile from the first firm,
storing, by the central source computer, the profile in a router that is part of the central source computer,
providing, by the central source computer, the triggered reference data to the router,
comparing, by the router, the stored profile to the accepted reference data to determine whether the triggered reference data should be sent to the first firm, and
sending, by the router, the triggered reference data to the first firm when the router determines that the triggered reference data should be sent to the first firm.

20. The method of claim 18, further comprising indemnifying, by the central source computer, the first firm from a loss due to faulty reference data.

* * * * *